United States Patent
Irving et al.

(12) 
(10) Patent No.: US 6,468,330 B1
(45) Date of Patent: Oct. 22, 2002

(54) MINI-CYCLONE BIOCOLLECTOR AND CONCENTRATOR

(75) Inventors: Patricia M. Irving, Kennewick; W. Lloyd Allen, Richland; Nathan D. Hindman, Kennewick; Trevor M. Moeller, Richland, all of WA (US)

(73) Assignee: Innovatek, Inc., Richland, WA (US)

( * ) Notice: Subject to any disclaimer, the term of this patent is extended or adjusted under 35 U.S.C. 154(b) by 0 days.

(21) Appl. No.: 09/596,222

(22) Filed: Jun. 14, 2000

Related U.S. Application Data

(60) Provisional application No. 60/139,495, filed on Jun. 14, 1999.

(51) Int. Cl.$^7$ .......................... B01D 45/12; B01D 47/00
(52) U.S. Cl. .......................... 95/219; 95/271; 55/343; 55/349; 55/459.1; 96/316; 96/413; 73/863.21
(58) Field of Search .......................... 55/346, 347, 349, 55/459.1, 460, 343; 96/314, 315, 316, 413; 95/271, 219; 73/863.21

(56) References Cited

U.S. PATENT DOCUMENTS

| | | | | |
|---|---|---|---|---|
| 2,696,275 A | * | 12/1954 | Pring ........................... | 55/349 |
| 3,093,468 A | | 6/1963 | Krochta | |
| 3,727,377 A | | 4/1973 | Chapman | |
| 4,267,048 A | | 5/1981 | Ohishi | |
| 4,734,109 A | * | 3/1988 | Cox ........................... | 96/316 |
| 5,011,517 A | * | 4/1991 | Cage et al. .............. | 73/863.11 |
| 5,238,475 A | | 8/1993 | Keuschnigg | |

\* cited by examiner

Primary Examiner—Robert A. Hopkins
(74) Att

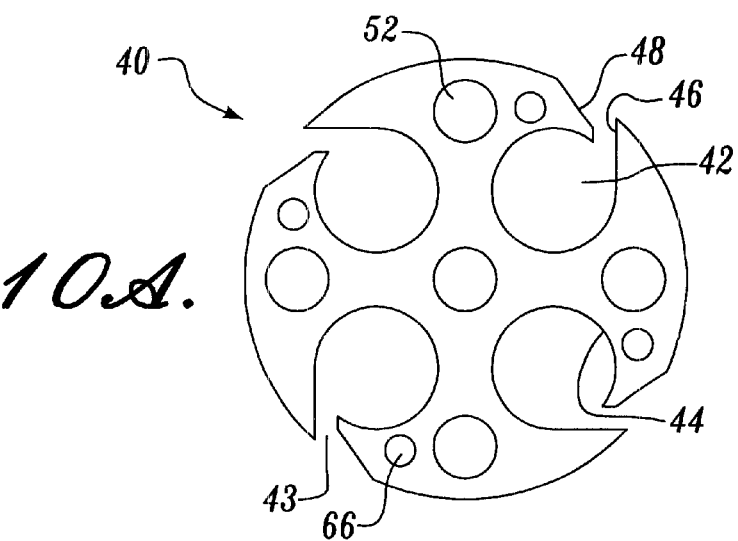
Fig. 10A.
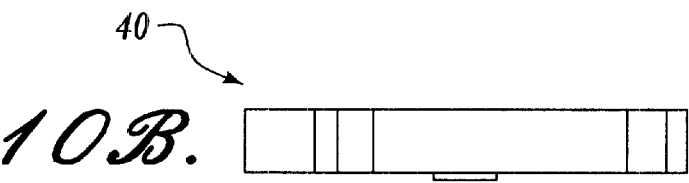
Fig. 10B.
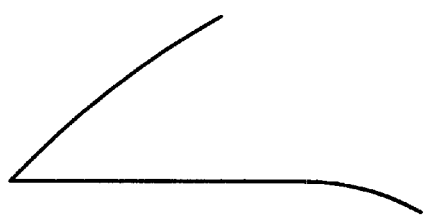
Fig. 10C.
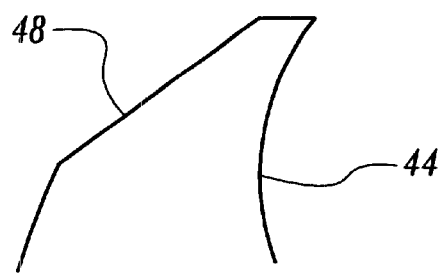

MINI-CYCLONE BIOCOLLECTOR AND CONCENTRATOR

RELATED APPLICATION

This application claims benefit from U.S. provisional application No. 60/139,495 filed Jun. 14, 1999, the disclosure of which is incorporated herein by reference.

FIELD OF THE INVENTION

This invention relates to a particle separator for separating particles from a stream of gas, and in particular to a particle separator using mini-cyclones that separate the particles from the gas stream and concentrate those particles within a quantity of liquid to be collected and monitored.

BACKGROUND OF THE INVENTION

The collection and monitoring of particles separated from a gas is needed in many diverse situations. Some of these situations include defense against biological warfare agents in battlefield and other military applications; and protecting the general public against: airborne pathogenic agents released by terrorist groups; genetically modified material used in biotechnology applications; infectious organisms contaminating air in hospitals, research labs, public buildings, and confined spaces such as subway systems; and pollutant aerosols that damage the respiratory system.

Bioaerosols are defined as airborne particles, large molecules or volatile compounds that are living, contain living organisms or were released from living organisms. The size of a bioaerosol particle may vary from 100 microns to 0.01 micron.

There is an increasing concern about the presence of aerosolized biocontaminants associated with the food processing industry. *E. coli,* salmonella, "Mad Cow" disease and other contaminants have resulted in widespread public concern about the safety of food products. The collection and measurement of bioaerosols are of interest to a wide community of public health officials because they can cause infectious diseases or chemical damage to the respiratory system. These particles are also of concern to the Department of Defense (DOD) because of their possible use in biological warfare and terrorism.

Air quality monitoring is also an important public health need. As the world's population rises exponentially and world travel becomes increasingly easy, the degree and pace at which communicable diseases can spread has resulted in significant concerns regarding potential epidemics from airborne disease transmission. Recirculation of air in buildings and other enclosed spaces such as subways and airplanes has lead to a potentially significant public health issue. Identification and control of infectious disease organisms in hospitals represents another major need. The Environmental Protection Agency cites indoor air pollution causing "sick building syndrome" as one of the five major environmental problems in the United States (Federal Register, Apr. 5, 1994; the regulatory driver for the quality of indoor air as proposed regulations for OSHA). According to the EPA, indoor air pollution affects 33 to 55 percent of commercial buildings, and causes 13.5 million lost work days each year. It can also lead to major public health incidents.

Nosocomial, or hospital-acquired, infections are often caused by antibiotic resistant microorganisms. These infections currently affect around 10% of hospital patients, causing additional suffering and mortality. The detection of pathogenic materials such as nosocomial pneumonia and Legionnaires disease in ventilation systems could help prevent infectious outbreaks of unknown origin in hospitals and public buildings. A miniaturized collection/detection system could easily be placed within the ventilation ducts of buildings and left sampling for an extended length of time.

The use of recombinant microorganisms is an expanding area of biotechnology for production of biochemicals, pharmaceuticals and vaccines. Increasingly, recombinant viral vectors are being used for vaccine delivery and gene therapy. Effective containment measurements are required but there is a need to be able to measure the effectiveness of these containment measures. For example, there is the possibility that aerosols created accidentally by laboratory procedures may escape from the containment provided by microbiological safety cabinets. Or, aerosols may be created by centrifugation, or liquid handling. At present, the means by which airborne viruses and bacteria can be detected and monitored are limited.

Threats from microorganisms in the air as a result of natural phenomena or human-induced activities such as the examples discussed above cannot be adequately monitored and evaluated with current technology. Early warning, hazard recognition, personal protective equipment, exposure evaluation, and environmental monitoring are needed to prevent and reduce impacts from airborne infectious or genetically modified material. Near real-time monitoring is necessary to avoid exposure and to initiate early treatment to arrest disease progression. Existing collection devices such as filters do not provide real time information because they must be taken to a laboratory for analysis. Detection devices for real time use by the military currently are large and power intensive.

A further deficiency with large collectors is that they have high inlet velocities and can severely damage or kill the microorganisms being collected. A high flow rate system that uses one large cyclone chambers requires a high inlet gas velocity for proper efficiency. However, a high inlet gas velocity also creates a large pressure drop across the cyclone chambers that results in a high power consumption. Further, microorganisms usually have to be collected alive for effective detection. The high inlet velocity needed for efficiency places large shear forces against the particles, killing the microorganisms needed alive for analysis.

Therefore, there is a need for small, efficient gas (aerosol) collectors to separate, capture and concentrate bioparticles from the air for detection.

SUMMARY OF THE INVENTION

The particle separation and collection assembly of the present invention uses cyclonic forces to separate and remove small particles from an airstream and concentrate small particles for sensor/detector technology. This system utilizes multiple mini-cyclones operating in parallel to reduce the velocity of the intake air while maintaining the same fluid or flow rate as compared to one large cyclone.

In one embodiment of the present invention, the particle separator and collection assembly comprises a plurality of particle separation chambers; each of the particle separation chambers having a conical shape with an internal surface; a lower vacuum chambers disposed in fluid communication with the particle separation chambers; a plurality of inlets, each inlet disposed in fluid communication with each particle separation chambers, each inlet supplying particle-laden gas external from the assembly to each particle separation chambers; and a liquid passage conduit connectable to a reservoir; the liquid passage conduit supplying a liquid from a reservoir to the internal surface of each particle separation chambers in order to collect the particles separated from the gas within each particle separation chambers.

In an alternate embodiment of the present invention, the particle separator and collection assembly includes a two stage system of concentric components to remove large interfering particles and retain small particles for collection and analysis. In this assembly, a large outer cyclone is used to separate particles >50$\mu$ and an inner bank of mini-cyclones is used to capture and concentrate small particles <50$\mu$. The two stage particle separator and concentrator assembly comprises a housing having a longitudinal axis, the housing including a top end portion connectable to a blower and a bottom end connectable to a pump; at least one cyclone chambers disposed within the housing and having an upper end and a lower end; and at least one housing inlet in fluid communication with at least one cyclone chamber, at least one housing inlet enabling particle-laden gas external from the apparatus to enter the at least one particle separation chambers; a liquid passage conduit disposed within the housing and connectable to a pump, the liquid passage conduit delivering the liquid to the upper end of the least one cyclone chambers; and an outer cyclone chambers concentric to the longitudinal axis and coupled to the housing, the outer cyclone chambers in fluid communication with the inlet, wherein particle-laden gas is pulled through the at least one cyclone chambers by a blower so that the particles are separated from the gas by centrifugal force and collected by the liquid supplied to the at least one cyclone chambers.

The present invention further includes a method for separating particles from a gas and collecting the particles within a liquid using a particle separation assembly, the particle separation assembly having a plurality of cyclone separation chambers disposed longitudinally within a housing of the assembly and having a longitudinal axis, the housing including a top end connectable to a blower, a bottom end connectable to a pump, and a plurality of inlets corresponding to the plurality of cyclone separation chambers for external gas to enter the assembly, a liquid passage conduit connectable to the pump for delivering the liquid to each cyclone separation chambers, the method comprising: drawing a particle-laden gas into the inlets of the housing and through the plurality of cyclone separation chambers so that a centrifugal force is created due to the configuration of the chambers; separating the particles from the gas by using the centrifugal force to move the particles outwardly away from the longitudinal axis and toward the inner wall of each cyclone chambers; supplying each cyclone chambers with the liquid through the liquid passage conduit; collecting the particles with the liquid by washing down the inner wall of each cyclone chambers and trapping the particles within the liquid.

The microassembly approach to aerosol collection of the present invention is advantageous by allowing process routes through large surface to volume ratios and short response times. Parallel processing using micro components allows process optimization of a single unit and subsequent scale-up by replication. Miniaturization of components also allows multi-component processing of an airstream for more efficient particle collection and concentration.

It is advantageous using a bank of miniature cyclones (1–3 cm diameter) in parallel. Parallel processing using multiple mini-cyclone chambers reduces the pressure drop across the separation unit significantly while processing the same amount of fluid (same fluid or flow rate) with the same efficiency as one large cyclone chambers. This also provides an assembly that has low power consumption due to lower inlet air velocity. Further, the lower inlet air velocity reduces the shear forces and abrasive wear against the particles and the continuous underfluid or flow commonly associated with the cyclone.

Another advantage of an assembly consisting of multiple mini-cyclones is that of total assembly size and volume. In terms of internal volume, our calculations indicate that a mini-cyclone assembly can be almost an order of magnitude smaller than a single large cyclone. This also benefits assembly weight and fluidic assembly volume. Further, the use of micro-machined, parallel components allows the particle separation and collection system to be assembled into smaller or larger architectures, making it extremely flexible and adaptable for a wide range of possible applications that can be integrated with a number of different biosensor or other detector technologies.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 1 illustrates an exploded, perspective view of the particle separator assembly of the present invention;

FIG. 2 illustrates an enlarged, perspective view of the base section of the present invention;

FIG. 3A illustrates a top view of the base section of the present invention;

FIG. 3B illustrates a cross-sectional view of the base section taken along the line I—I of FIG. 3A;

FIG. 3C illustrates another cross-sectional view of the base section taken along the line I—I of FIG. 3A;

FIG. 4 illustrates a bottom view of the base section of the present invention;

FIG. 5 illustrates an enlarged, perspective view of the conical cyclone section of the present invention;

FIG. 6 illustrates an enlarged view of the top of the conical cyclone section of the present invention;

FIG. 7A illustrates a top view of the conical cyclone section of the present invention;

FIG. 7B illustrates a side elevation view of the conical cyclone section of the present invention;

FIG. 7C illustrates a bottom view of the conical cyclone section of the present invention;

FIG. 7D illustrates an end view of the under fluid or flow pipe that is connected to the conical cyclone section of the present invention;

FIG. 7E illustrates a side elevation view of the under fluid or flow pipe of FIG. 7D;

FIG. 8A illustrates an enlarged, perspective view of the cyclone inlet section of the present invention;

FIG. 8B illustrates an enlarged, perspective view of the cylindrical cyclone section of the present invention;

FIG. 9A illustrates a top view of the cylindrical cyclone section of the present invention;

FIG. 9B illustrates a side elevation view of the cylindrical cyclone section of the present invention;

FIG. 10A illustrates a top view of the cyclone inlet section of the present invention;

FIG. 10B illustrates a side elevation view of the cyclone inlet section of the present invention;

FIG. 10C illustrates an enlarged partial view of the tapered outer wall of the cyclone inlet section of the present invention;

DETAILED DESCRIPTION OF THE PREFERRED EMBODIMENT

The present invention is a cyclone particle separation system that separates particles trapped in a gas stream and concentrates the particles in a liquid reservoir for analyzing. The particle separator is a lightweight, compact system that collects and concentrates biological material from the air. The system is used in conjunction with a control unit and can be integrated with several types of biodetectors and sensors or can be used as a stand-along system. The control unit (not shown) operates the cyclone assembly by controlling the flow rate and direction of air and liquid through the blower and peristaltic pump, respectively.

Figure 1:
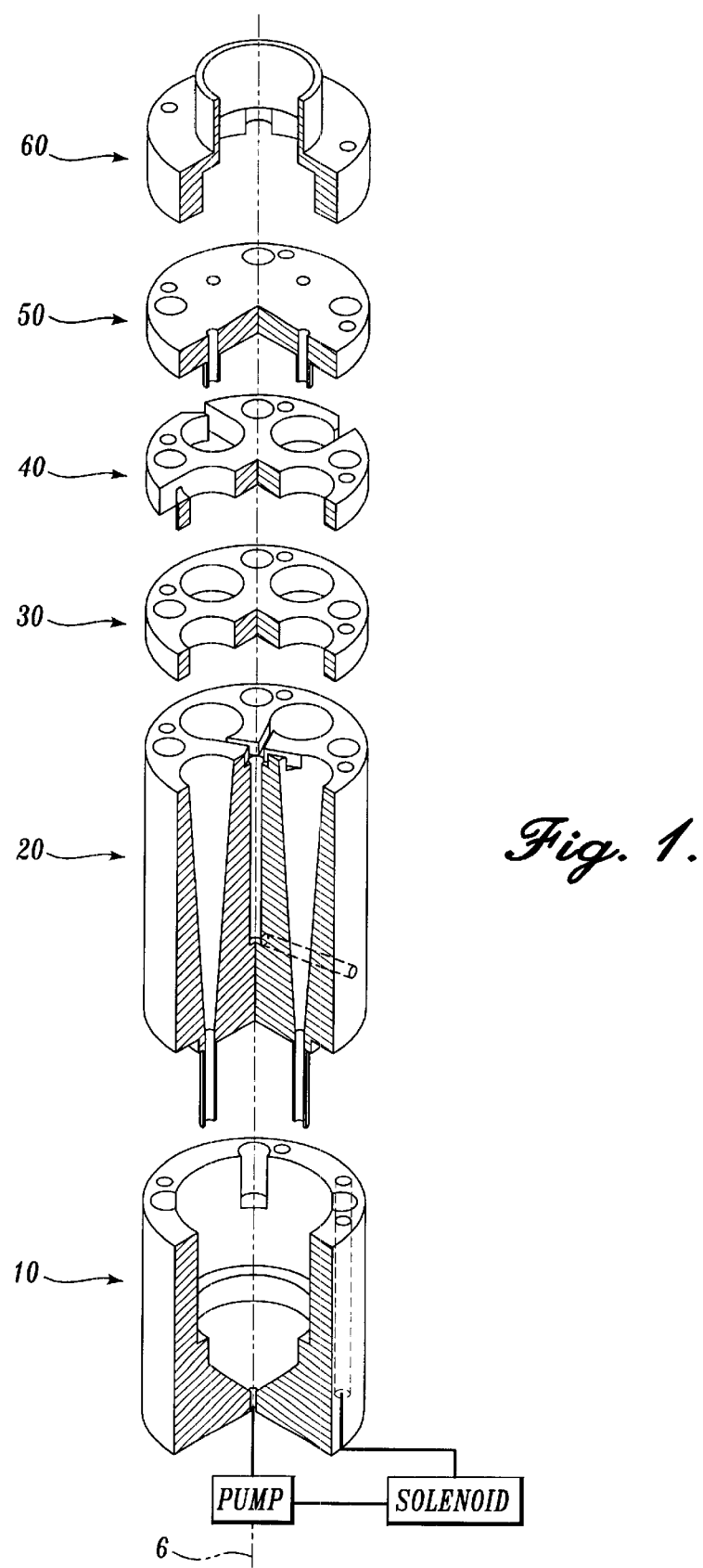

FIG. 1 illustrates the first embodiment of the present invention. FIG. 1 describes a mini-cyclone particle separator and collector assembly 2 including a housing comprised of six, sections. The housing is comprised of six individual sections; however, the housing may be integral or constructed in any number of pieces as required. All housing sections are shown as generally cylindrical in overall shape, although other exterior shapes may be used. When assembled, each section is coaxial with respect to the assembly longitudinal central axis 6 and are held together by elongate bolts 4 extending the entire length of assembly 2. The housing sections are made from plastic using an injection molding process; however, other materials and processes may be used.

Figure 2:
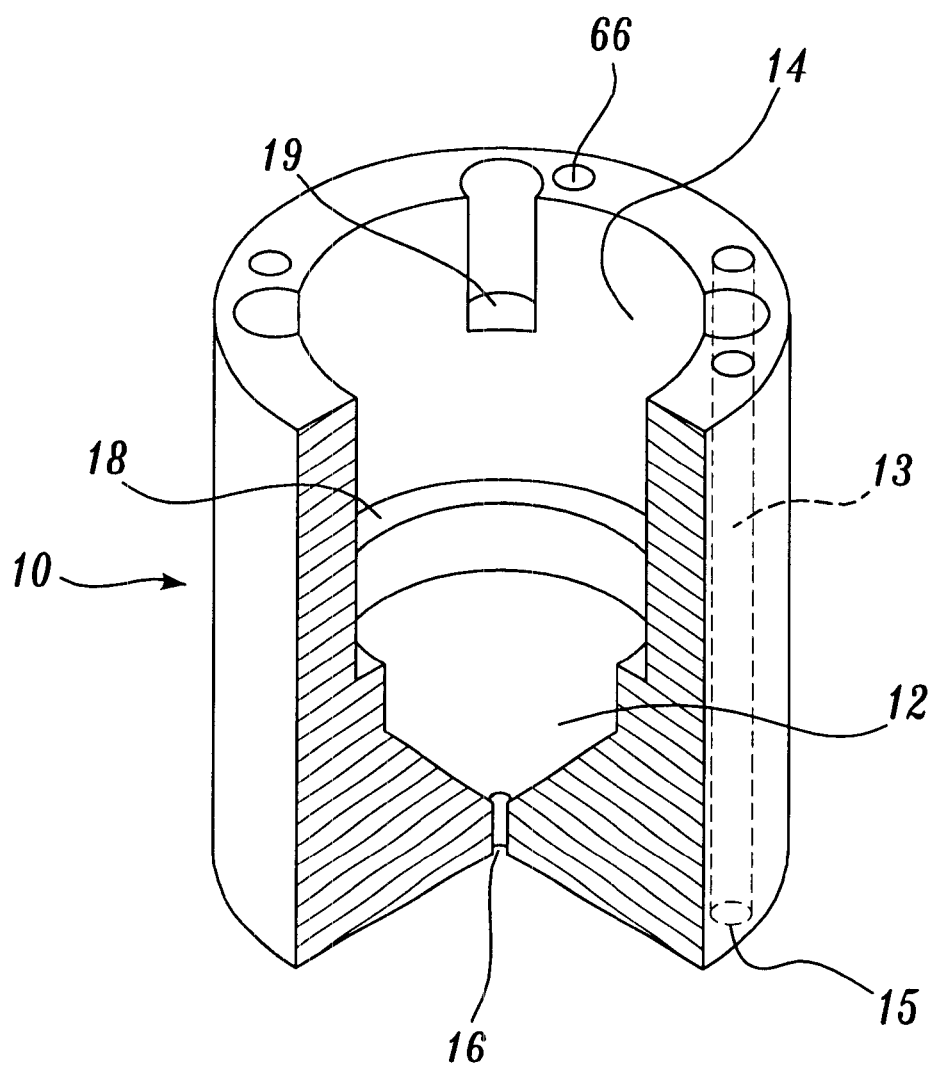
Figure 3A:
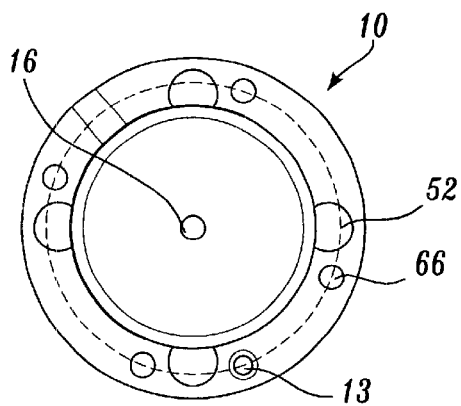
Figure 3B:
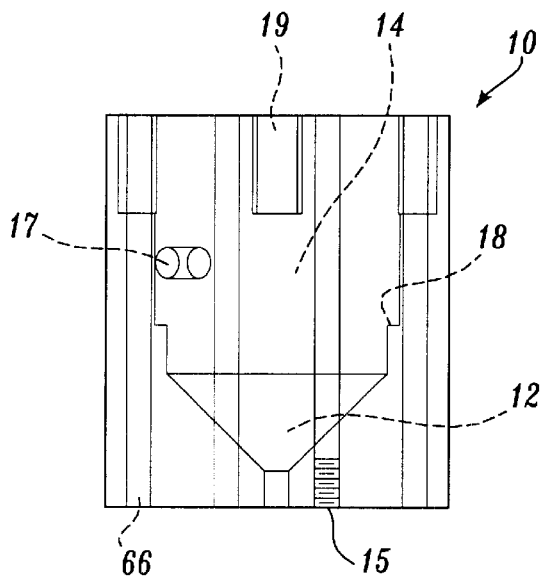
Figure 3C:
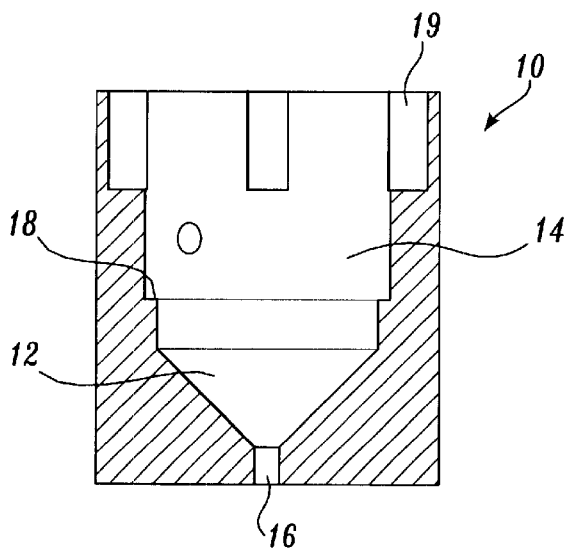
Figure 4:
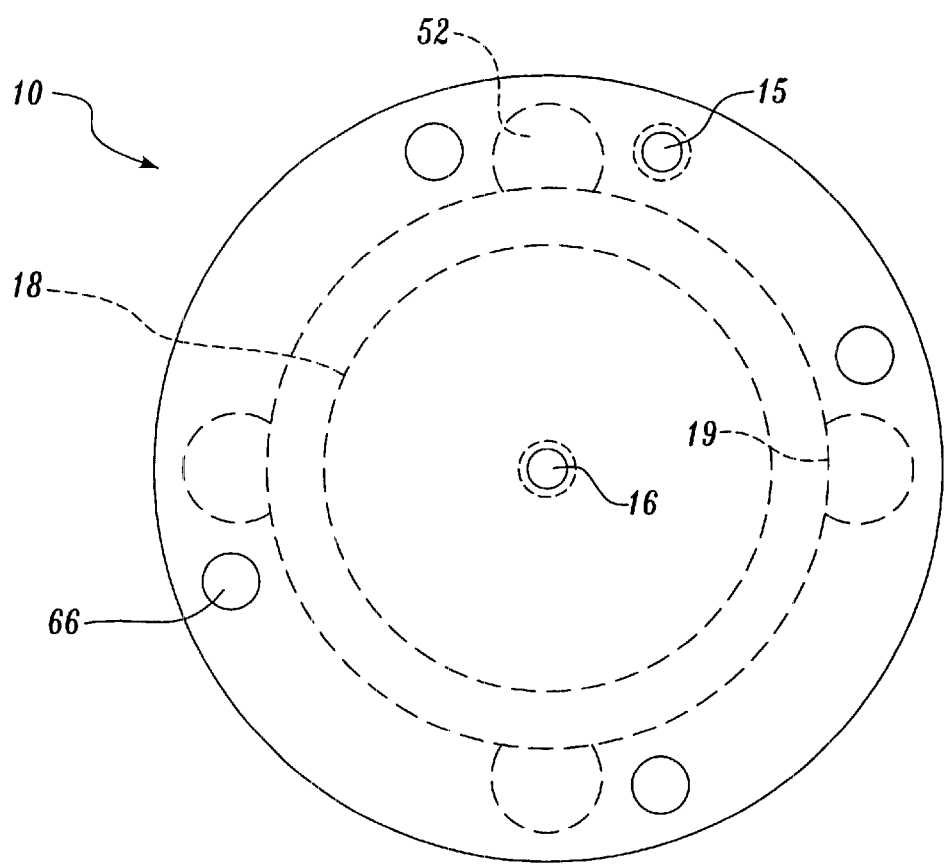
Figure 5:
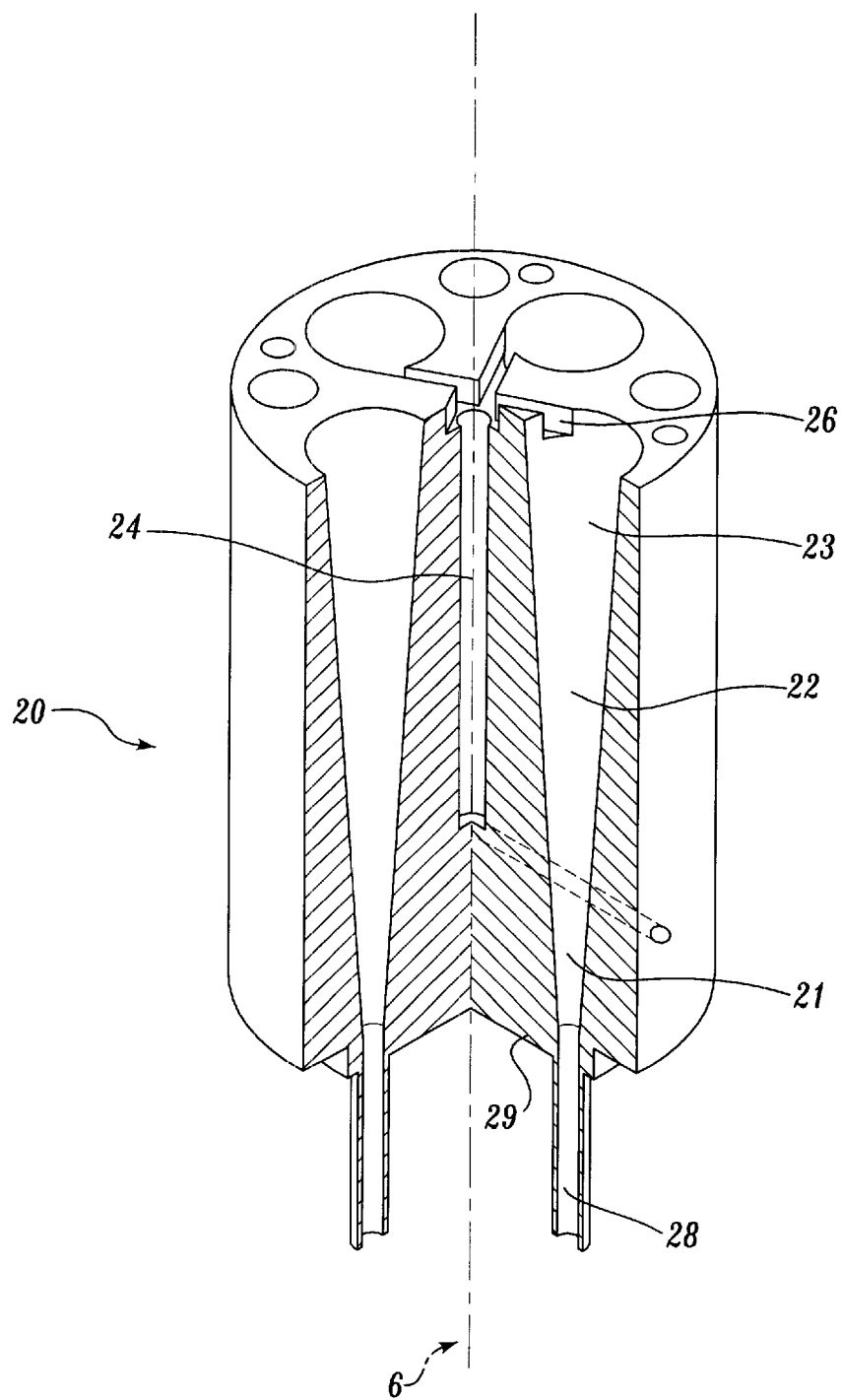
Figure 6:
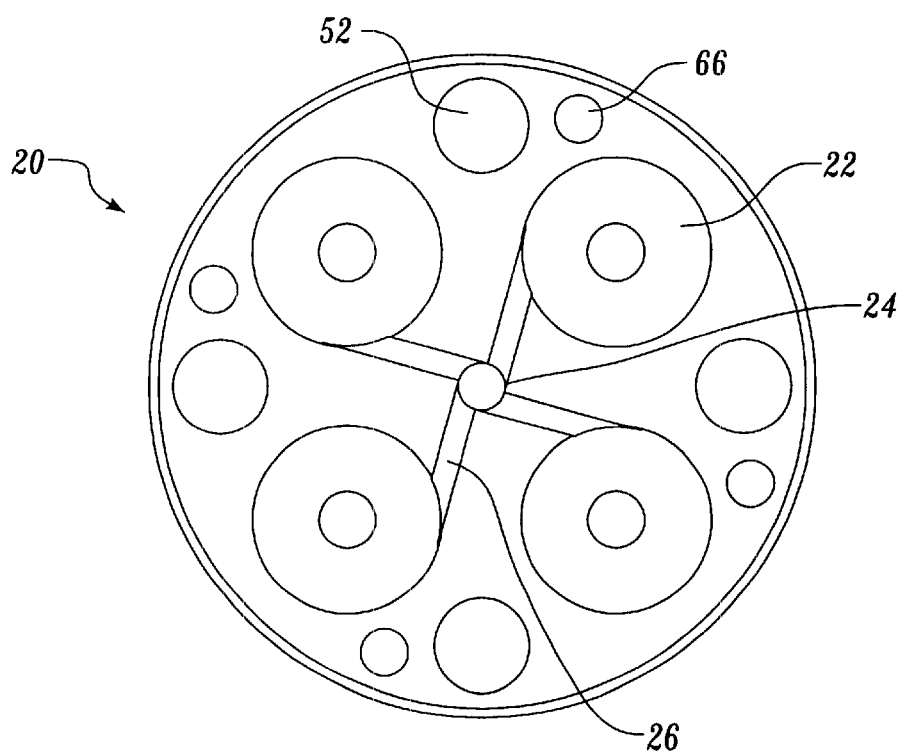
Figure 7A:
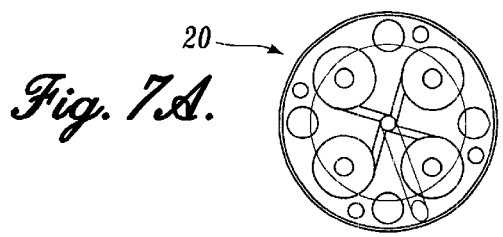
Figure 7D:
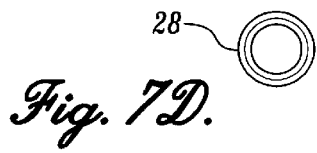
Figure 7B:
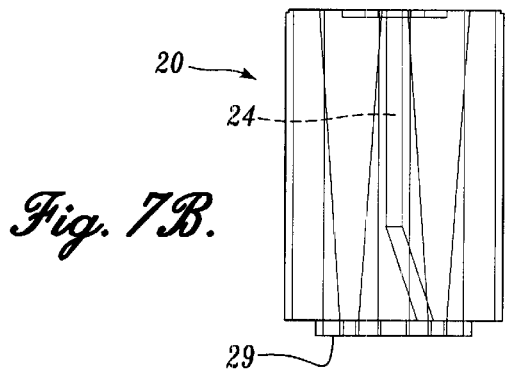
Figure 7E:
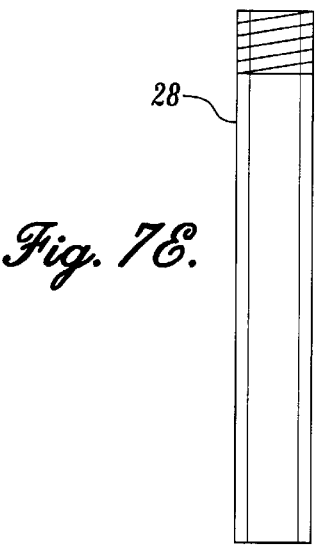
Figure 7C:
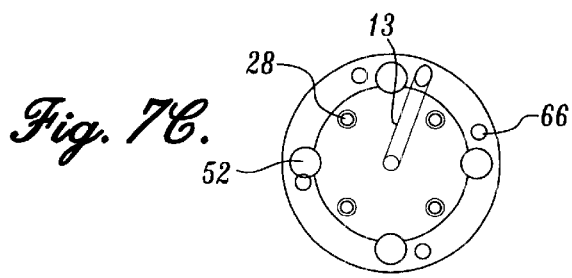
Figure 8A:
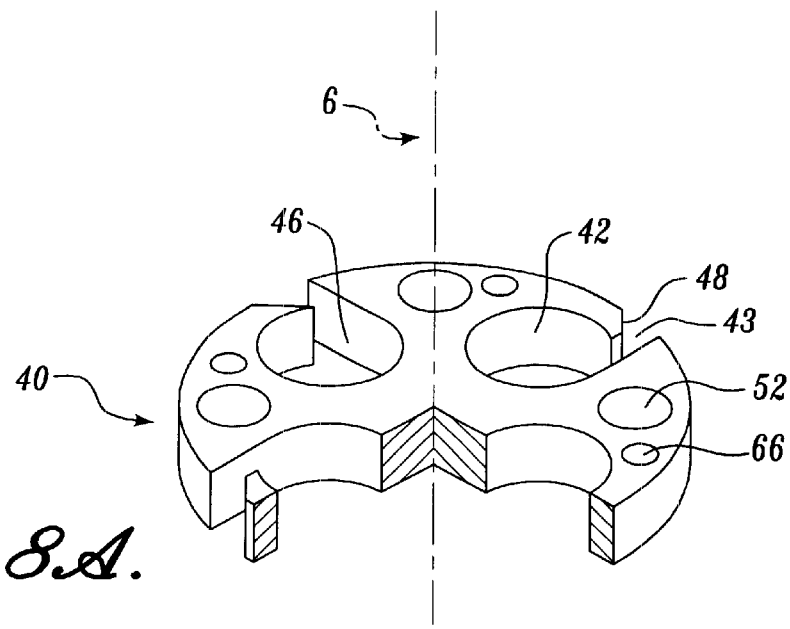
Figure 8B:
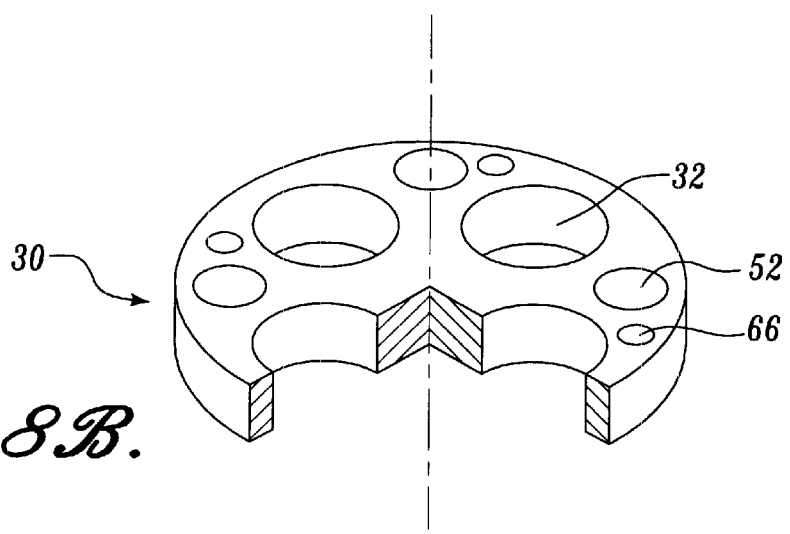
Figure 9A:
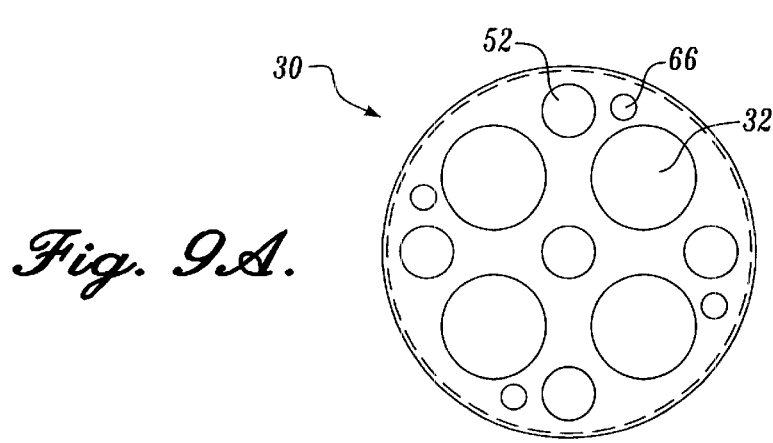
Figure 9B:
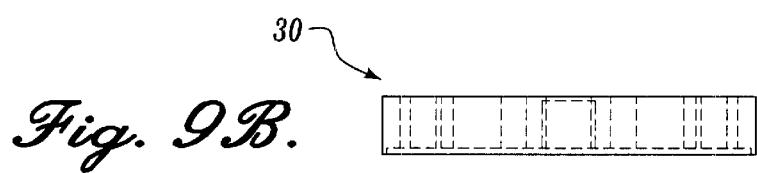
Figure 11:
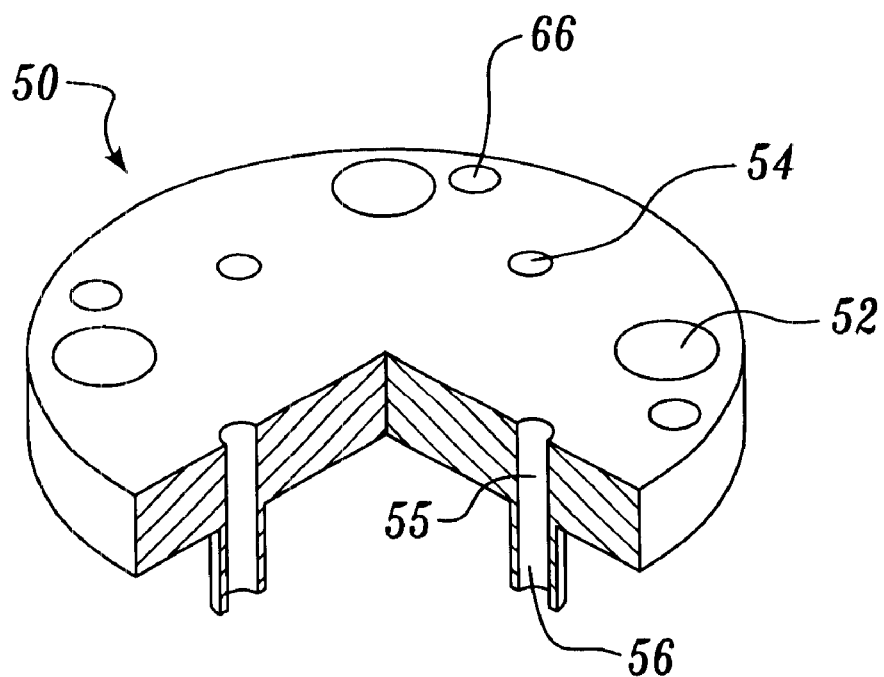
FIG. 11 illustrates an enlarged, perspective view of the upper cyclone vent section of the present invention.
Figure 12A:
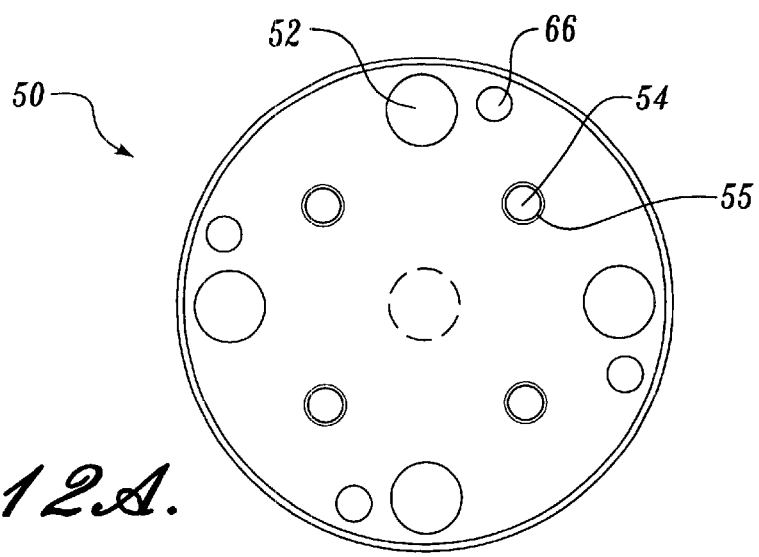
FIG. 12A illustrates a top view of the upper cyclone vent section of the present invention.
Figure 12B:
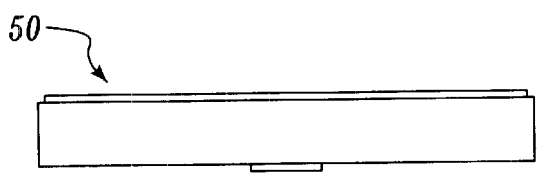
FIG. 12B illustrates a side elevation view of the upper cyclone vent section of the present invention.
Figure 12C:
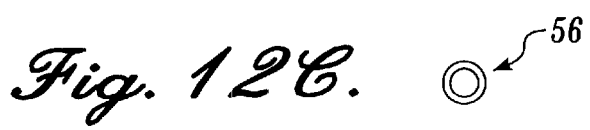
FIG. 12C illustrates a top view of the underfluid or flow pipe that is connected to the conical cyclone section of the present invention.
Figure 12D:
FIG. 12D illustrates a side elevation view of the underfluid or flow pipe that is connected to the conical cyclone section of the present invention.
Figure 13:
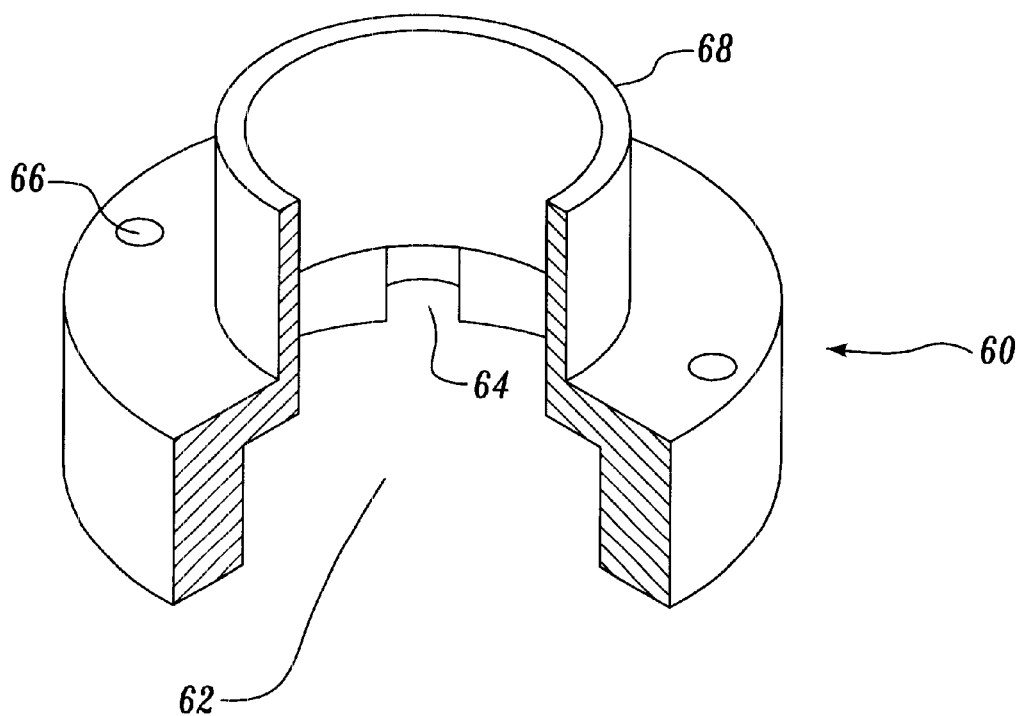
FIG. 13 illustrates an enlarged, perspective view of the top section of the present invention.
Figure 14A:
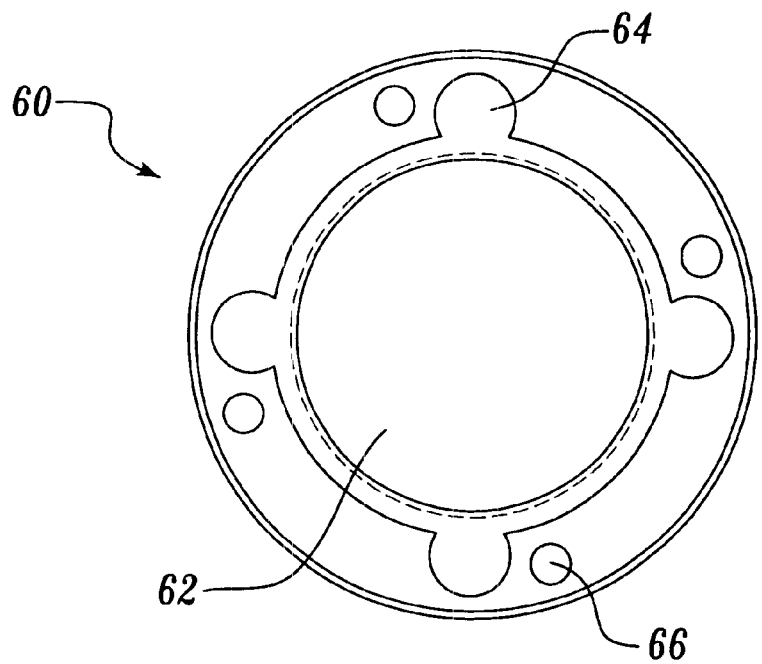
FIG. 14A illustrates a top view of the top section of the present invention without the flange attachment.
Figure 14B:
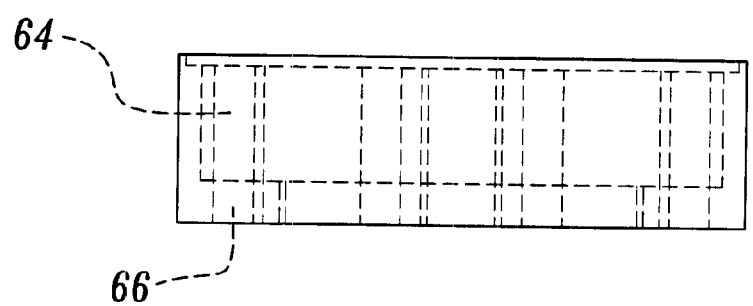
FIG. 14B illustrates a side elevation view of the top section of the present invention without the flange attachment.
Figure 15:
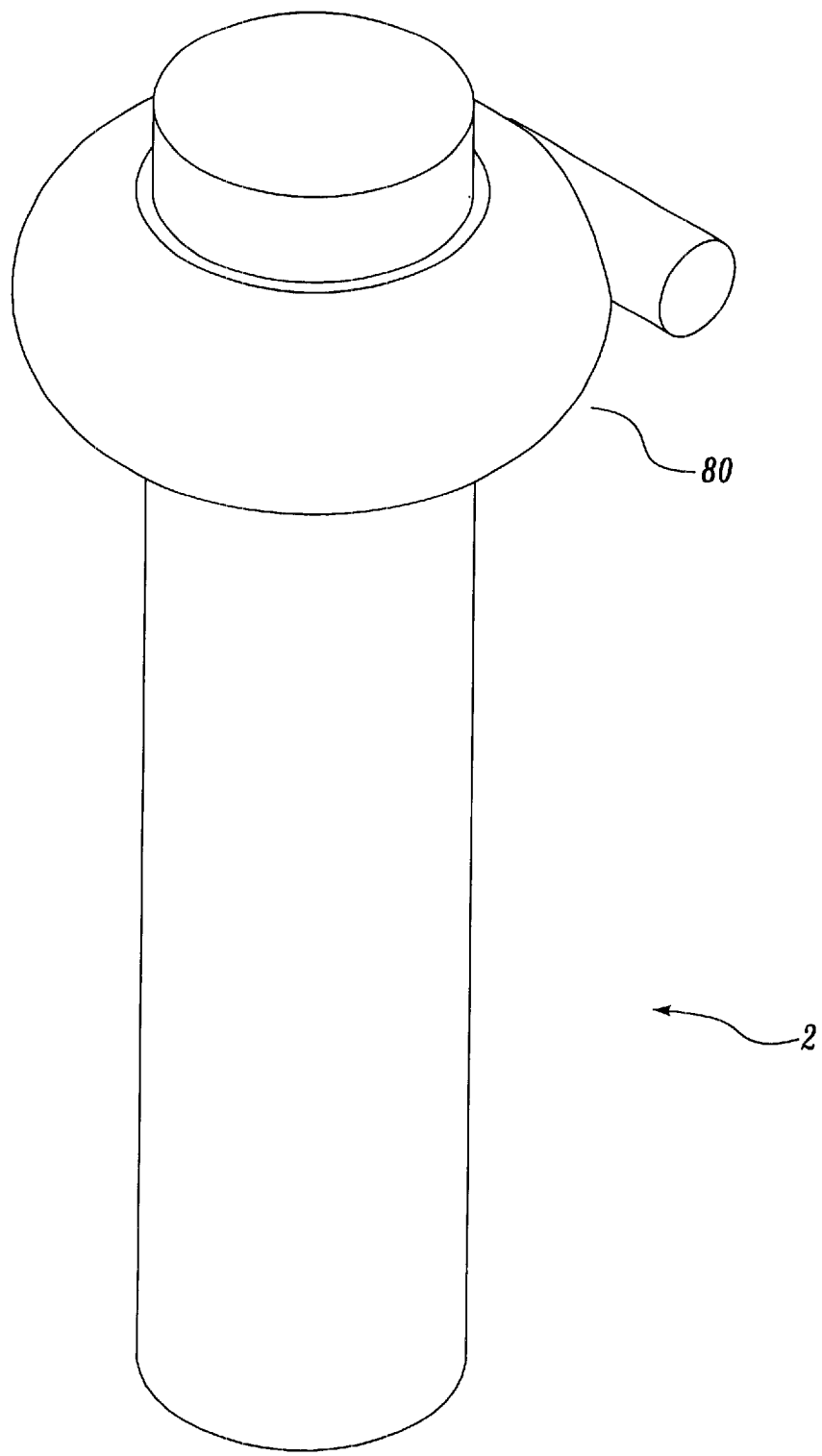
FIG. 15 illustrates the integration of a blower with the particle separation assembly of the present invention.

As shown in FIGS. 1 and 2, the mini-cyclone particle separator assembly 2 includes base section 10 comprising an internal reservoir 12 and a lower vacuum chambers 14. Referring to FIGS. 1, 2 and 3B, lower vacuum chambers 14 is located toward the top of base section 10 adjacent underfluid or flow pipe outlet 28 of conical cyclone section 20 discussed below. Lower vacuum chambers 14 is connected in fluid or flow communication to four vacuum transfer channels 52 at lower openings 19. Each opening 19 is located adjacent to underfluid or flow pipes 28. Reservoir 12 stores the liquid and provides a collection location to receive liquid from underfluid or flow pipe 28. At the bottom of the base section 10, a small diameter central outlet 16 is provided to connect to the suction side of a peristaltic pump (not shown). The pump, in operation with a solenoid valve, lifts the liquid from internal reservoir 12 upwardly through a central liquid passage 24 of cyclone section 20 and into the top of the cyclone chambers 22. Base section 10 may include an internal shoulder 18 located approximately midway down the height of interior wall of base section 10. Internal shoulder 18 provides support for three screens (not shown) that break up any foam in the liquid stream fluid or flowing out of underfluid or flow pipe 28. The control unit (not shown) can direct the liquid collected through a conduit attached to outlet 16 to a monitoring system to check for the presence of toxic microorganisms among the particles collected.

As shown in FIG. 1, the lower end of conical cyclone section 20 attaches to the top of base section 10. Section 20 includes an internal flange or shelf 29 that extends from the central axis 6 and approaches the outer edge, leaving approximately the wall thickness of base section 20. Referring to FIGS. 1 and 5–7D, conical cyclone section 20 defines four separate particle separation or cyclone chambers 22, each formed on a downwardly tapered, conical shape extending longitudinally therethrough. Each chambers 22 extends parallel to center axis 6 and is preferably disposed equidistant around central axis 6. The conical cyclone section 20 includes a central, small diameter liquid passage pipe or conduit 24 that extends the entire length of conical cyclone section 20. Liquid passage pipe 24 begins at the top of the conical cyclone section 20 and continues down the center of section 20, along central axis 6 and then angles radially outwardly to connect to an outer passage 13 extending down through base section 10. The bottom outlet 15 of outer passage 13 is connected to the pressure side of a miniature peristaltic pump (not shown) at the lower end of base section 10. Liquid passage pipe 24 supplies liquid to top portion 23 of the conical chambers 22 through tangential inlet opening 26. The liquid entering each chambers 22 through a tangential opening 26 traps the particles within the liquid as the liquid washes down the interior walls of chambers 22. The liquid exits out of bottom portion 21 of chambers 22 through underflow pipe or apex outlet 28 and back into base section 10. Underflow pipe 28 is connected to chambers 22 through screw threads 27. The pump (not shown) supplies liquid to the chambers 22 through pipe 24 at a fluid or flow rate of about 1–25 milliliters per minute; however, greater or lesser fluid or flow rates can be achieved based on specific requirements of the user.

As shown in FIG. 1, cylindrical cyclone section 30 attaches to the top of conical cyclone section 20. Referring to FIGS. 8B and 9A–9B, cylindrical cyclone section 30 includes four cylindrical cyclone chambers 30. Each chambers 30 is aligned directly above a corresponding conical chambers 22. Vacuum transfer channels 52 and clearance holes 66 extend through cylindrical cyclone section 30.

As shown in FIG. 1, the bottom of cyclone inlet section 40 is attached to the top of cylindrical cyclone section 30. Referring to FIGS. 8A and 10A–10C, cyclone inlet section 40 includes four chambers 42 each having inner wall or surface 44. Each chambers 42 has a tangential inlet 43 that connects chambers 42 to the external environment. Chambers 42 further connects in fluid or flow communication with a corresponding cylindrical chambers 30 and a corresponding conical chambers 22 to form the entire cyclone chambers. Each inlet 43 has a generally rectangular shape in cross-section and connects to chambers 42 through entrance wall 46. Entrance wall 46 is tangential to cylindrical inner surface 44 of chambers 42. Each inlet 43 also is formed by a tapered entrance wall 48 to facilitate particle-laden gases to enter through inlet 43 to chambers 42. Tapered wall 48 projects away from inner tangential wall 46 of the cylindrical chambers 42 by approximately 35 degrees. An air fluid or flow rate of about 100–500 liters per minute is achieved by the configuration of the present invention; however, greater or lesser fluid or flow rates may be achieved when additional cyclone chambers are used and/or when cyclone size is adjusted. To achieve the 100–500 liters per minute fluid or flow rate, in one preferred embodiment of the present invention, the assembly is preferably approximately 7 cm in diameter and approximately 20 cm in length employing four cyclone chambers. Preferably, the top of the cyclone chambers has a diameter of 2 cm, the bottom diameter of the bottom of the cyclone chambers is 0.6 cm, and the height of the cyclone chambers is 10 cm.

As shown in FIG. 1, upper cyclone vent section 50 is attached to the top of cyclone inlet section 40 by bolts extending through close fitting clearance holes 66. Referring to FIGS. 11 and 12A–12D, cyclone vent section 50 includes four vent passageways 54 that extend vertically through the generally disk-shaped vent section 50. Each vent passageway is disposed parallel to assembly axis 6 directly above chambers 42 and has a threaded inner surface 55. Four overflow pipes or vortex finder outlets 56, cylindrical in shape, have partial threaded outside surfaces 57. Each pipe 56 is attached to vents 54 by the meshing of corresponding threaded surfaces 55 and 57. Overflow pipes 56 extend downwardly and into the respective cylindrical chambers 42 of cyclone inlet section 40. Each overfluid or flow pipe extends from the bottom of upper cyclone vent section 50 to approximately the bottom of cyclone inlet section 40.

Most of the incoming particle-laden gas moves downward in an helical fluid or flow pattern through the cyclone chambers (cylindrical and conical section). Some of the downward fluid or flow leaves through the underfluid or flow outlet through vacuum transfer passages 52 and exits out of upper vacuum chambers 62. The rest of the gas (after most the particles have been separated and captured by the liquid) reverses its vertical direction and travels upwardly via an inner helical fluid or flow and exits the conical chambers through overflow pipe 56. This gas continues up through vents 54 and out of the assembly by the blower induced vacuum.

As shown in FIG. 1, top section 60 is attached to the top of upper cyclone vent section 50. Referring to FIGS. 13 and 14A–14B, top section 60 includes an upper vacuum chambers 62 and an external coupling nipple 68. External coupling nipple 68 is attached to a blower or vacuum pump (not shown). Top section 60 has four clearance holes 66 that extend the entire length of assembly 2. Each vacuum transfer passage 52 exits into upper vacuum chambers 62 at an upper opening 64. Upper vacuum chambers 62 is connected in fluid or flow communication with the top of conical chambers 22 through vents 54 and cylindrical chambers 30.

In operation, a blower or vacuum pump draws outside gas into the cyclone particle separator assembly through radial inlets 43. Vacuum transfer channels 52, extending the entire length of the assembly 2, pull gas into the top portion 23 of the cyclone chambers 22 and out through apex 28 of cyclone chambers 22. Gas entering the cyclone particle separation chambers 22 from inlet 43 swirls downwardly through cylindrical cyclone section 30 and into the conical shaped chambers 22 due to the tangentially aligned inlet 43. The gas travels in a helical pattern downwardly toward the bottom portion 21 of conical chambers 22. Due to centrifugal forces, the particles flow outwardly away from the center axis of the chambers 22 and toward the walls of the respective chambers 22. Liquid is pumped into chambers 22 from internal reservoir 12 through the central liquid passage tube 24. This liquid wets the particles in chambers 22 and washes down the chambers walls flushing the particles into reservoir 12. The liquid is continuously recirculated through the conical chambers by the peristaltic pump (not shown) thereby concentrating the particles within the liquid over time. The liquid then can be pumped to an optionally integrated detector/sensor system comprised of detectors and sensors. The detector/sensor system can send out a warning if toxic microorganisms are present. If particle concentration is not needed, the liquid can be pumped immediately to the detector/sensor system.

EXAMPLE 1

A scaled-down 20 LPM cyclone system according to one embodiment of the present invention was used in these initial tests using an aerosolized microorganism in an environmental chamber. An antigen-antibody test called "Origin" was used to quantify the microorganism collected by the cyclone system and growth of the organisms on culture medium. Initial results were obtained from the Origin assays for *Erwinia herbicola* tests. The Origin test recognized both living and killed biological material. The results (Table 1) indicate that the mini cyclone biocollector of the present invention is more efficient than the reference collector used.

TABLE 1

Collection Efficiency for *Erwinia herbicola* during a 15 minute Sampling Period for Cyclones Biocollectors Compared to All-Glass Impinger Reference Collector. Data are in Colony-Forming Units per ml Collection Solution per Liter Air Sampled. Organisms were quantified using the "Origin" Antigen-Antibody Test.

| Cyclone 1 | Cyclone 2 | Reference Collector |
| --- | --- | --- |
| 1.51 E3 | 1.23 E3 | 1.05 E3 |
| 1.8 E3 | 1.93 E3 | 1.25 E3 |
| 2.7 E3 | 1.51 E3 | 1.11 E3 |

FIGS. 16–28 shows an alternative embodiment of the present invention. Referring initially to FIGS. 16 and 27A–27C, the alternative embodiment is a particle separation assembly or system that uses cyclonic forces to separate and remove large particles from an airstream and concentrate small particles for sensor/detector technology. The alternative embodiment is a portable, multi-functional device that is suitable for pathogen separation and collection in field situations.

Figure 27A:
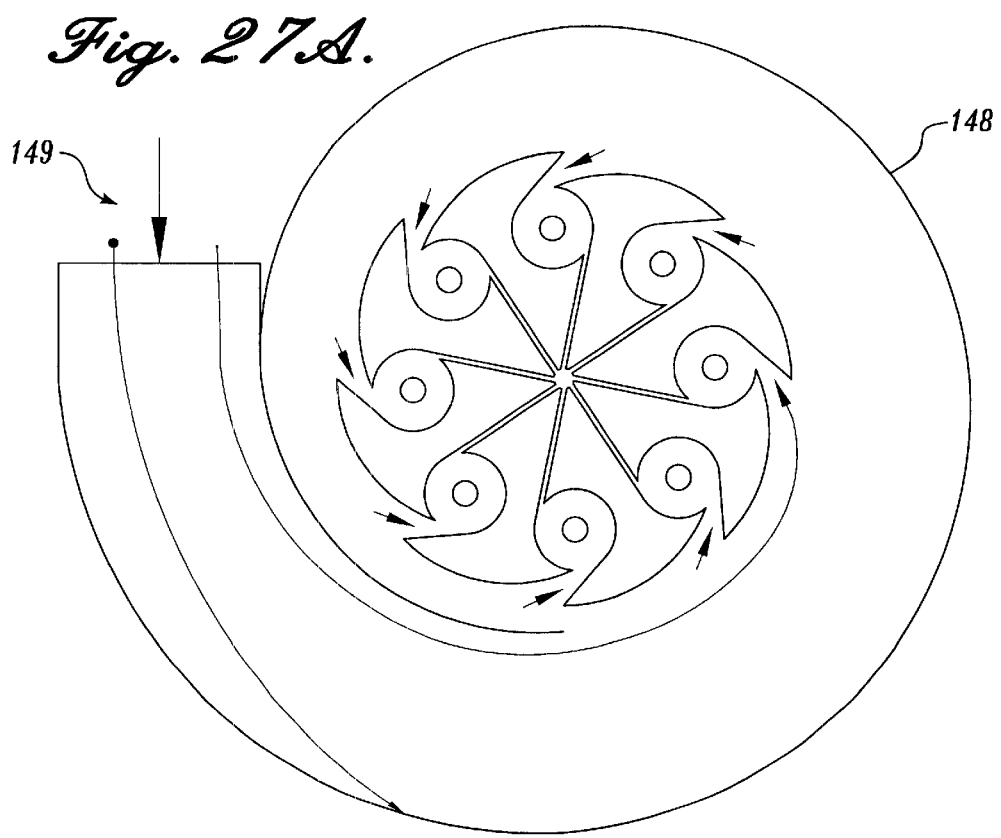
FIG. 27A illustrates a top view cross section of the outer particle separator combined with the inner min-cyclone collector of the present invention.
Figure 27B:
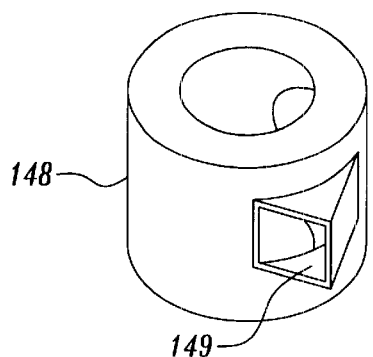
FIG. 27B illustrates a side perspective view of the outer helical cyclone for the large particle separation of the alternative embodiment of the present invention.
Figure 27C:
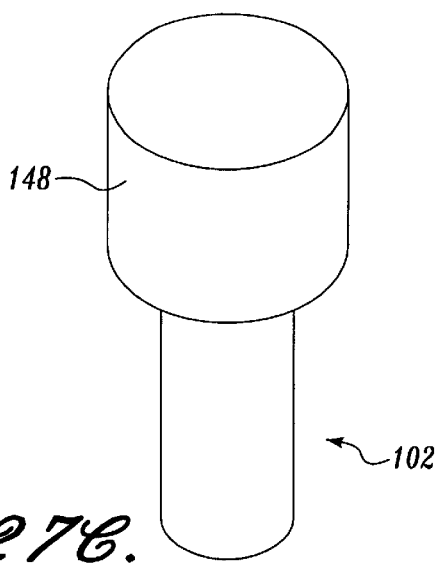
FIG. 27C illustrates a side perspective view of alternative embodiment of the present invention.
Figure 28:
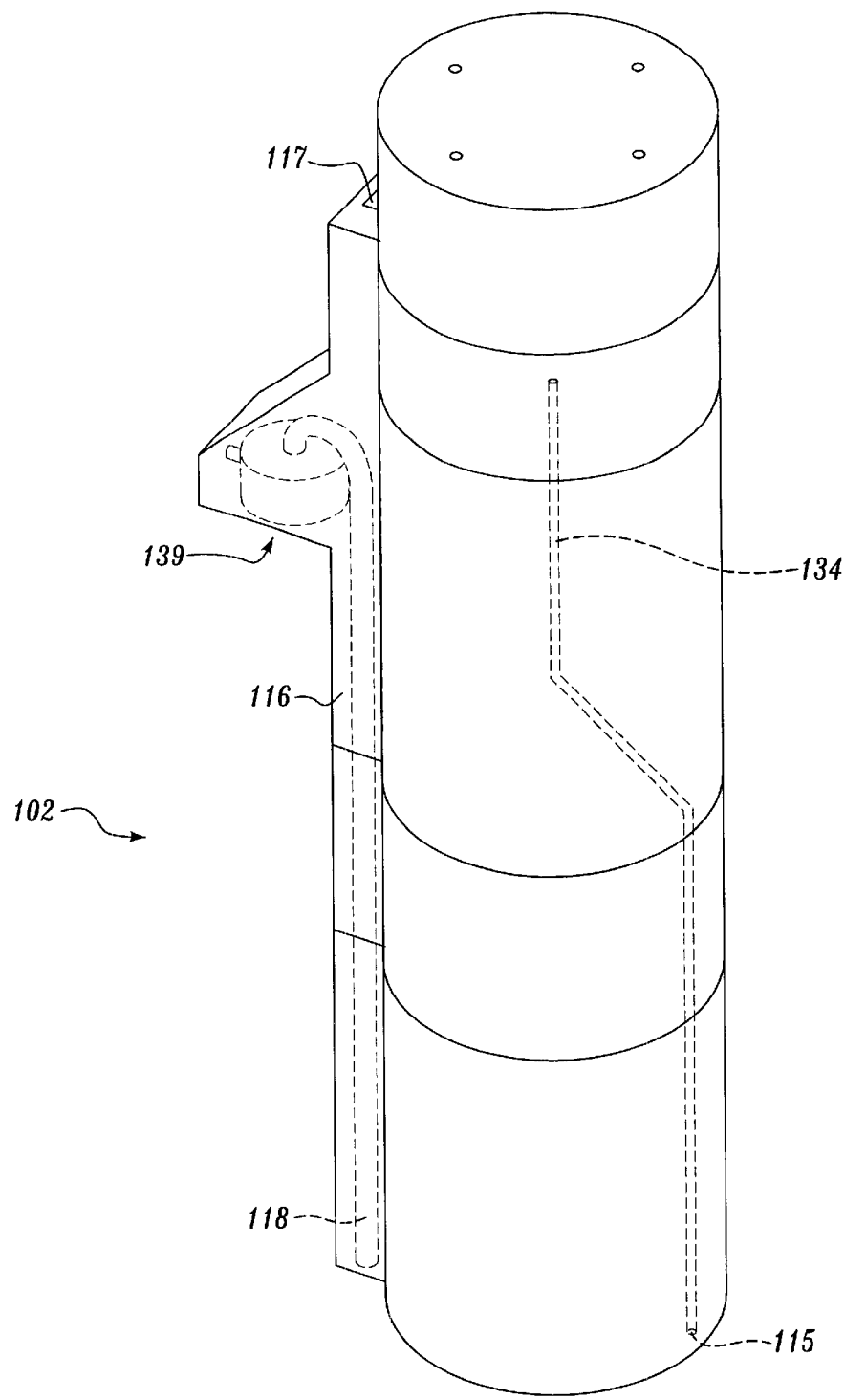
FIG. 28 illustrates an enlarged, perspective view of the alternative embodiment of the particle separator assembly of the present invention.

The alternative embodiment of the particle separator and collector assembly, as show in FIGS. 27–28, uses an outer cyclone to remove larger particles from an airstream and an inner mini-cyclone series to concentrates smaller particles into a liquid. FIGS. 15–28 describes a mini-cyclone particle separator and collector assembly 102 includes a housing comprised of five sections. However, the housing may be integral or constructed in any number of pieces as required. All housing sections are cylindrical in shape, although other exterior shapes may be used. When assembled, each section is coaxial with respect to the assembly longitudinal central axis 106 and are held together by elongate bolts 104 extending the entire length of assembly 102. The housing sections are made from plastic using an injection molding process; however, other materials and processes may be used.

Figure 16:
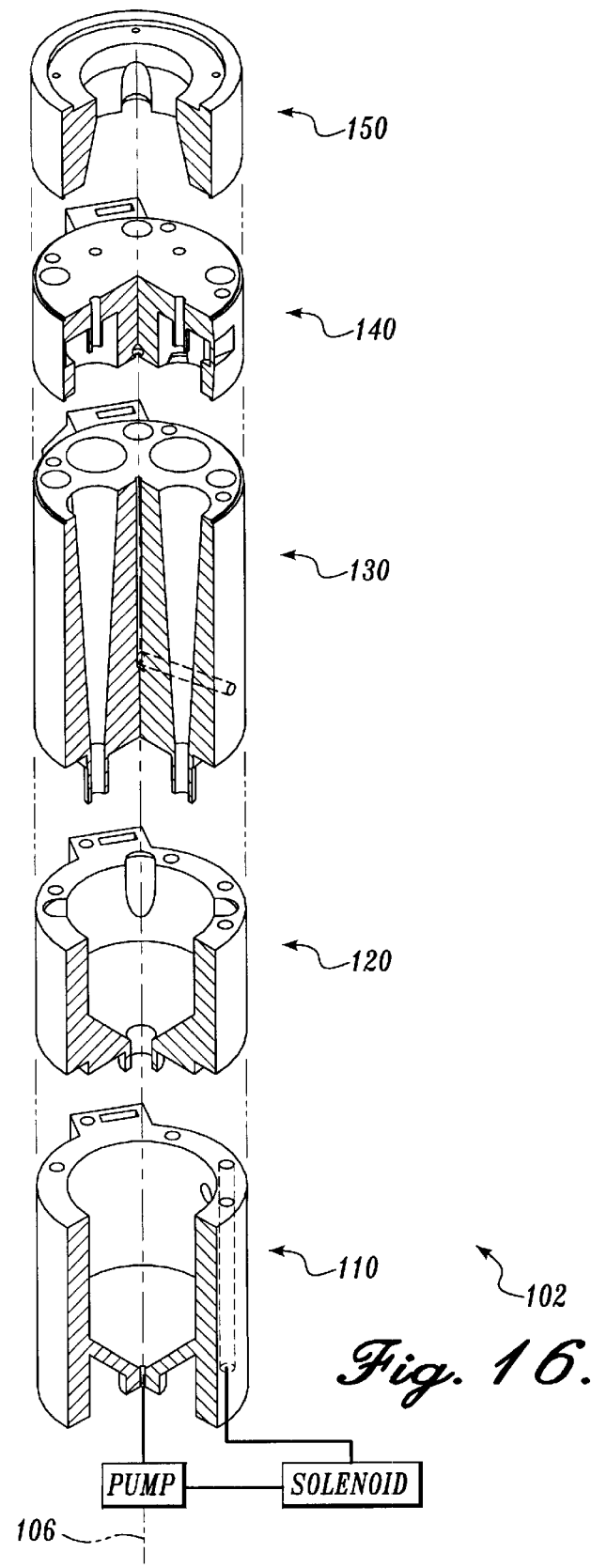
FIG. 16 illustrates an exploded, perspective view of the alternative embodiment of the particle separator assembly of the present invention.
Figure 17:
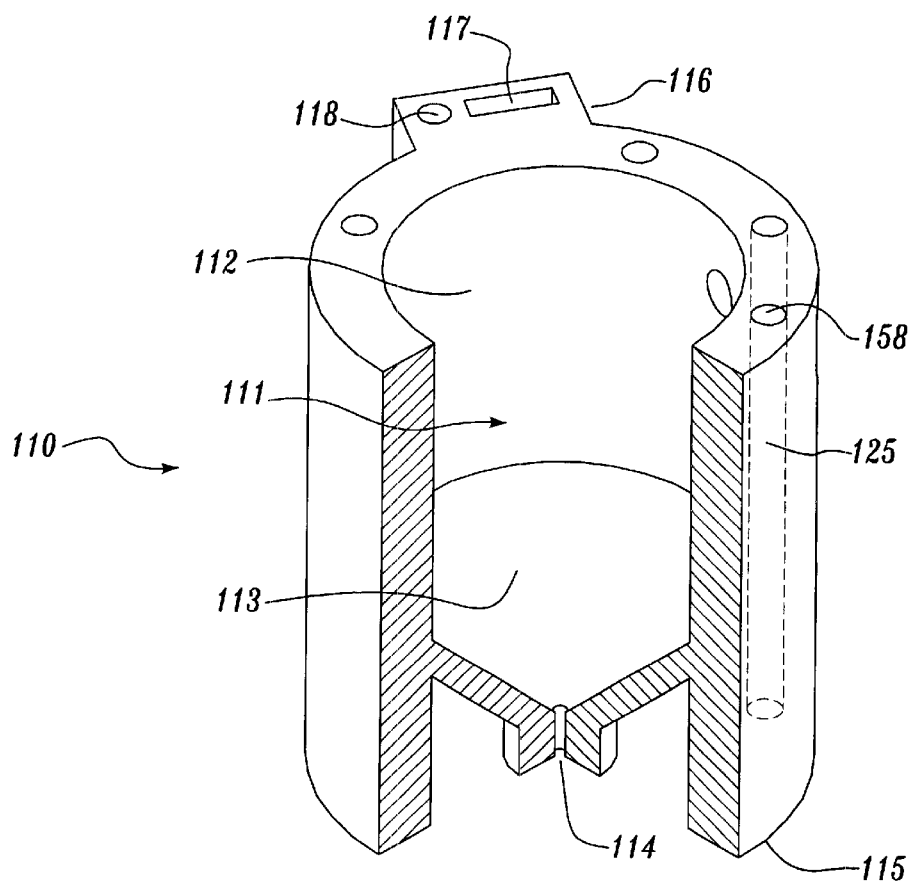
FIG. 17 illustrates an enlarged, perspective view of the reservoir section of the alternative embodiment of the present invention.

As shown in FIG. 16, the. mini-cyclone particle separator assembly 102 includes fluid reservoir section 110 comprising a fluid chambers or reservoir 111. Reservoir 111 stores the liquid and provides a collection location to receive liquid from underfluid or flow pipe 28. Fluid reservoir 111 is divided into an upper cylindrical section 112 and a lower conical section 113. Conical section 113 begins approximately midway down the internal surface of fluid reservoir section 110 and terminates at small diameter central outlet 114 at the bottom of fluid reservoir section 110. Small diameter outlet 114 connects to the suction side of a peristaltic pump (not shown). The miniature peristaltic pump feeds each cyclone chambers 132 a metered volume of liquid through a tangential opening in the cyclone wall. Pumping rates as low as 0.25 ml/min to each cyclone have proved to be satisfactory for wet-wall operation. An electrical solenoid valve is used to direct fluid or flow up the central liquid passage 134 from reservoir 113 to the cyclone chambers 132 for recycling of liquid during a collection period (and thus concentration of particles), or alternatively out to a sample port or sensor/detector device for detection of any toxic microorganisms present in the liquid. When real time sensors for specific biological materials are developed a low continuous or intermittent liquid fluid or flow will be supplied to the cyclones that will then be pumped to the sensor unit.

The design has integrated fluid or flow channels for air and liquid movement. Several different reservoir sections 110 can be fabricated to hold varying amounts of liquid for wetting the walls of the cyclone chambers 132 and concentrating the sample. The layered component design of the cyclone assembly allows the operator to change reservoir components depending on the length of the sampling period desired. A larger reservoir is used for longer sampling periods so that enough liquid is available to replace evaporative loss.

Referring to FIGS. 17–26, a vertical column 116 is attached to the exterior surface of fluid reservoir section 110 and includes an internal channel 117 and a liquid collection and return conduit 118. Internal collection and return conduit 118 is connected in fluid or flow communication to the pump (not shown) at the bottom of fluid reservoir section 110. Internal channel 117 allows wires from both the pump and the blower to run the entire length of vertical column 116. Vertical column 116 extends from the bottom of fluid reservoir section 110 up to the external surface of cyclone head section 140. Liquid may be added to, the reservoir 111 by using the fluid collection port 139. A collection tube filled with liquid is attached to fluid collection port 139. Liquid from the collection tube is pumped through internal collection and return conduit 118 to the reservoir 111 by operating the pump in reverse mode. A secondary injection port 115 may also be included to fluid reservoir section 110 to allow liquid to be added to the reservoir. Secondary injection port 115 is located just below the top of fluid reservoir section 110 and can be used to inject liquid into the system using a syringe without powering up the pump (not shown).

Figure 18:
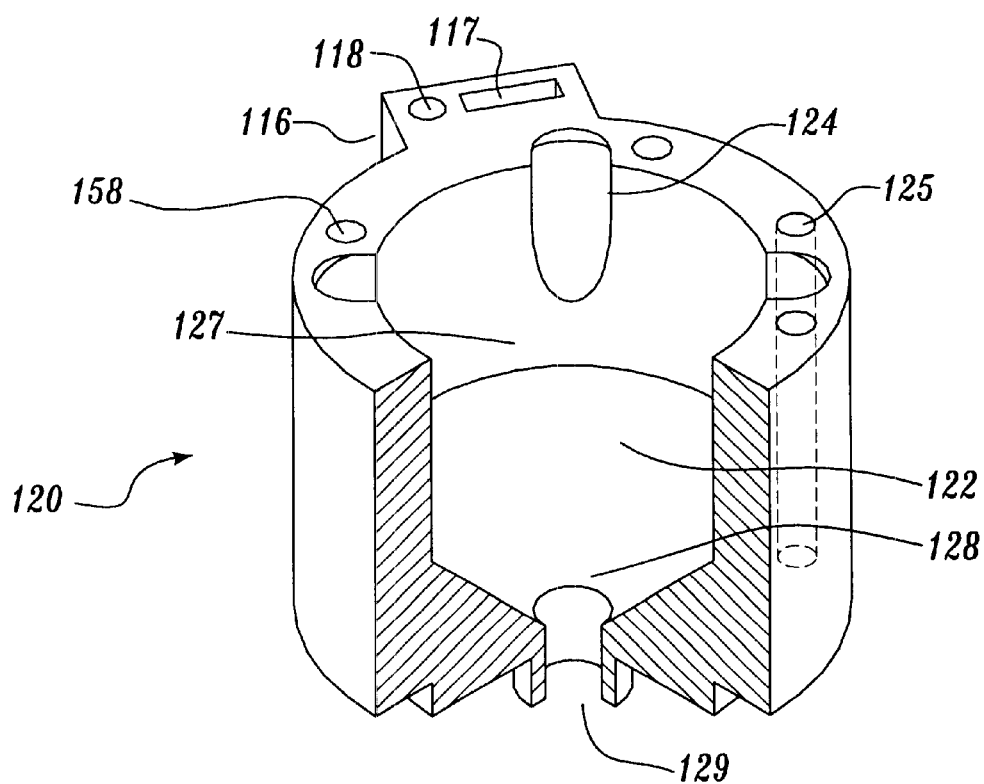
FIG. 18 illustrates an enlarged, perspective view of the splash guard section of the alternative embodiment of the present invention.
Figure 19:
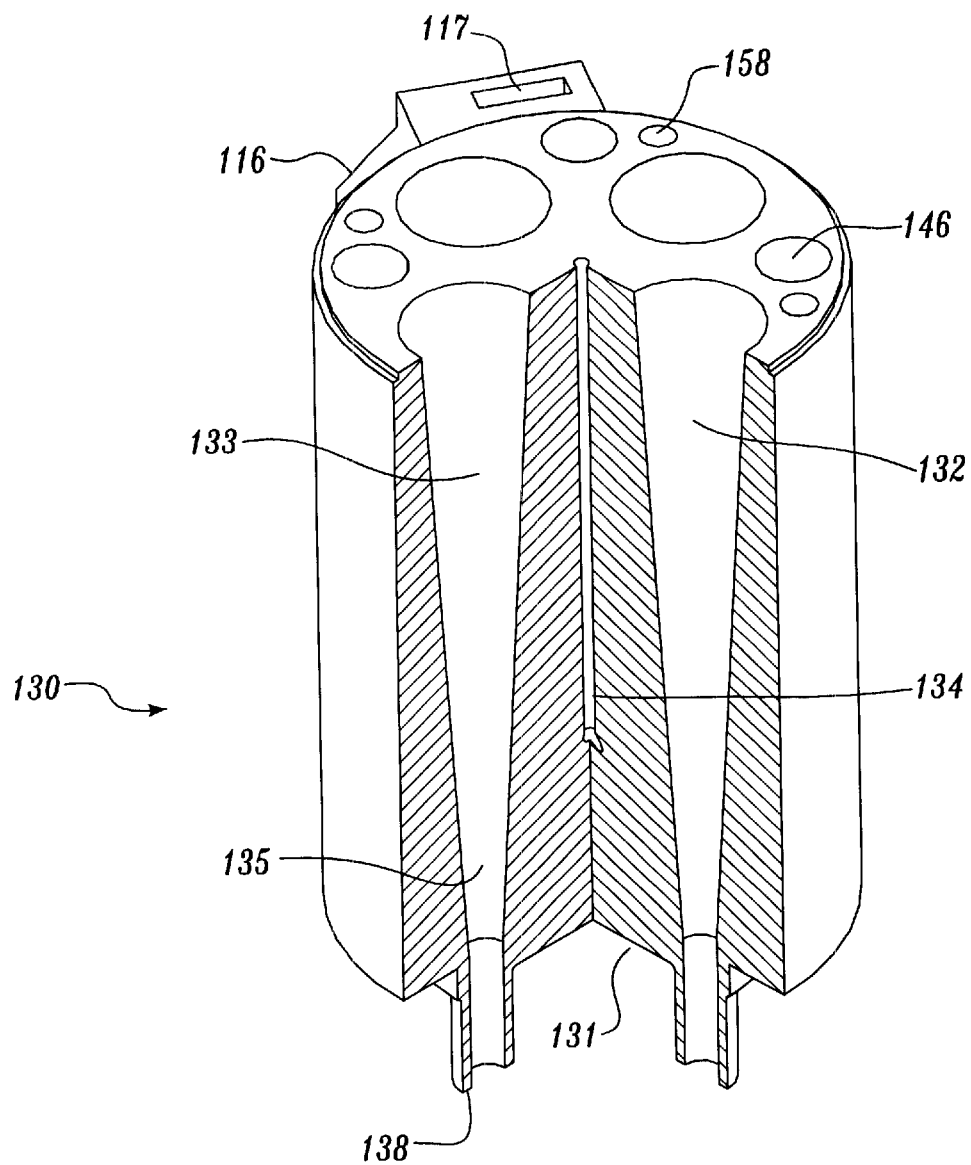
FIG. 19 illustrates an enlarged, perspective view of the cyclone section of the alternative embodiment of the present invention.
Figure 20:
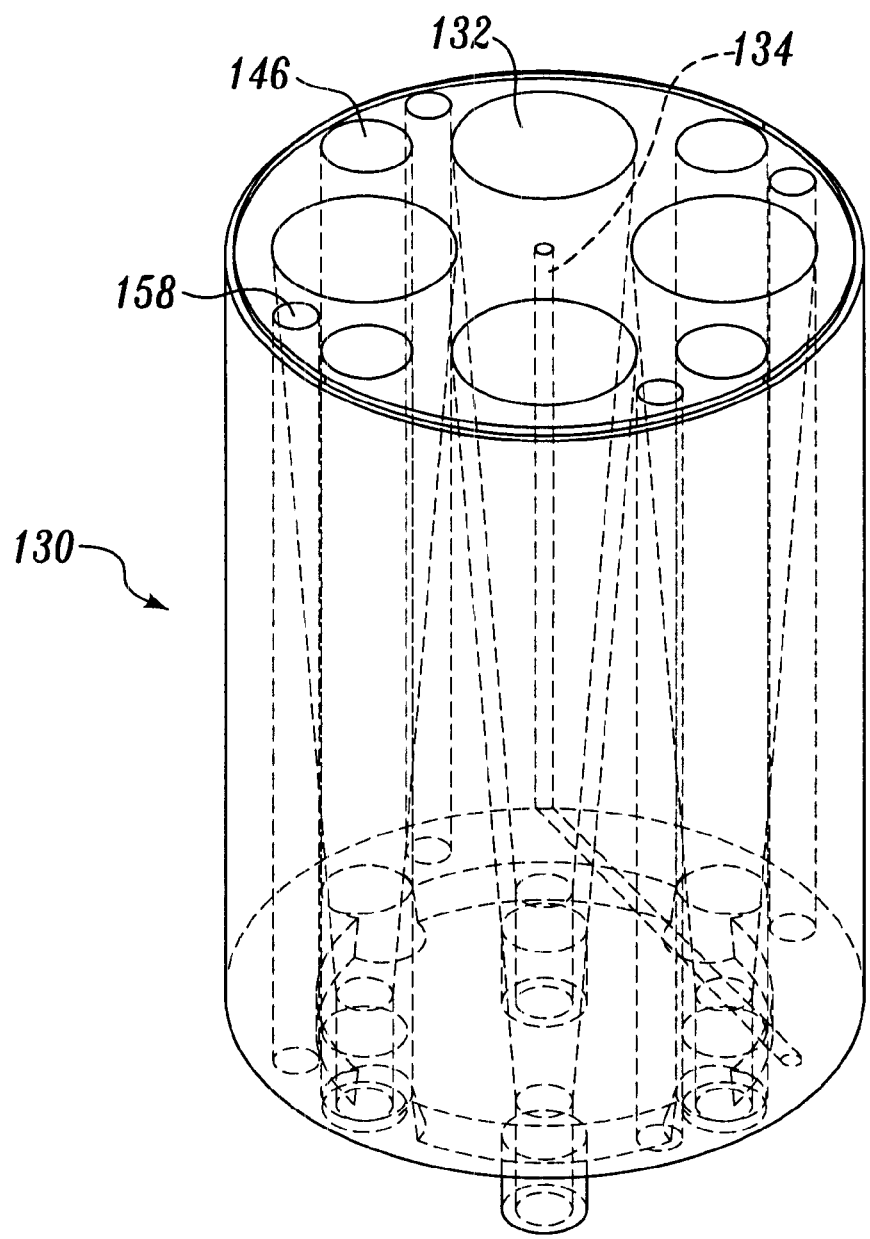
FIG. 20 illustrates an enlarged, perspective view of the cyclone section of the alternative embodiment of the present invention.

As shown in FIG. 16, the lower end of splash guard section 120 attaches to the upper end of fluid reservoir section 110 and comprises a lower vacuum chambers 122. Referring to FIGS. 16 and 18, lower vacuum chambers 122 is located adjacent to underflow pipe outlet 138 of conical cyclone section 130 discussed below. Lower vacuum chambers 122 is connected in fluid or flow communication to four vacuum transfer channels 146 at lower openings 124. Vacuum transfer channels 146 extend from splash section 120 and terminate at top section 150 at opening 154. Each lower opening 124 is located adjacent to underfluid or flow pipe 138. Lower vacuum chambers 122 contains an upper cylindrical portion 127 and a lower conical portion 128. Lower conical portion 128 terminates into outlet 129. Outlet 129 allows liquid to return to reservoir 111.

As shown in FIG. 16, the lower end of conical cyclone section 130 attaches to the top of splash guard section 120. Cyclone section 130 includes an internal flange or shelf 131 that extends from the central axis 6 and approaches the outer edge, leaving approximately the wall thickness of splash guard section 130. Referring to FIGS. 16, 19, 20 and 25, conical cyclone section 130 defines four separate chambers 132, each formed on a downwardly tapered, conical shape extending longitudinally therethrough. Each chambers 132 is parallel to center axis 6 and is disposed equidistant around central axis 106. The conical cyclone section 130 includes a central, small diameter liquid passage pipe or conduit 134 that extends within conical cyclone section 130. Central liquid passage 134 begins at the top of the conical cyclone section 130 and continues down the center of section 130, along central axis 106 and then angles radially outwardly to connect to an outer passage 125 extending down through splash guard section 120 and fluid reservoir section 110 and terminating at bottom outlet 115. Bottom outlet 115 of outer passage is connected to the pressure side of a miniature peristaltic pump (not shown) at the lower end of fluid reservoir section 110. Central liquid passage pipe 134 supplies liquid to the cylindrical chambers 142 through a tangential inlet openings 175. The liquid entering each chambers 142 through the tangential opening traps the particles within the liquid as the liquid washes down the interior walls of chambers 132. The liquid exits out of bottom portion 135 of chambers 132 through underfluid or flow pipe or apex outlet 138 and back into fluid reservoir section 110. Underflow pipe 138 is connected to chambers 132 through screw threads (not shown), The pump (not shown) supplies liquid to the chambers 132 through pipe 134 at a fluid or flow rate of about 1–25 milliliters per minute.

Figure 22:
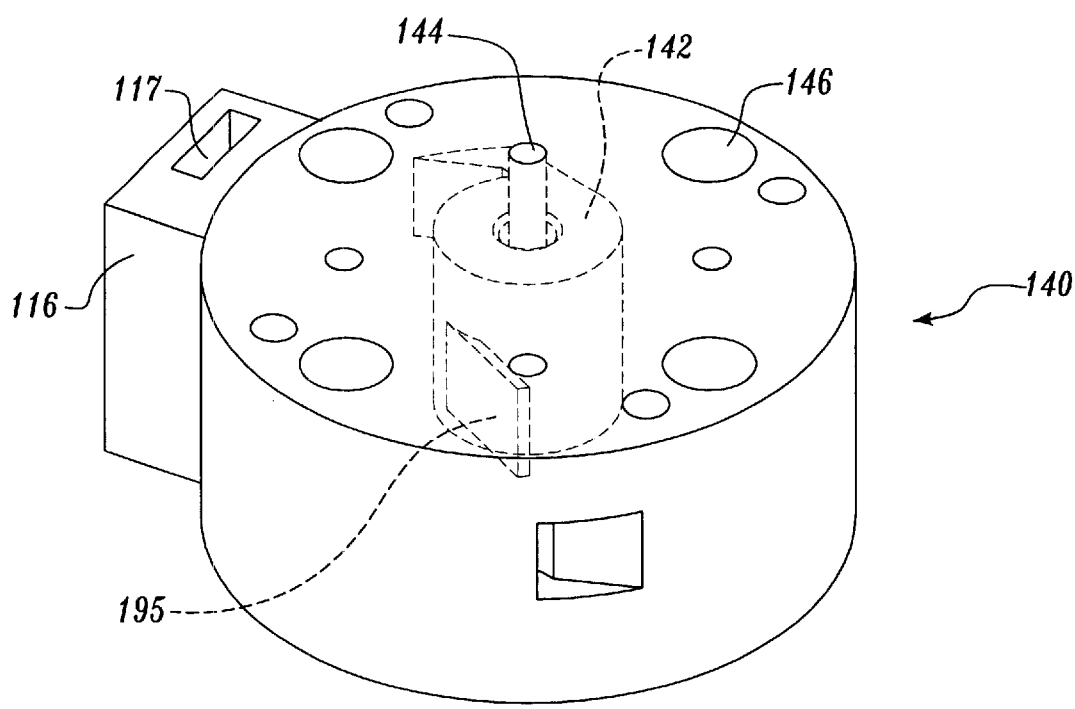
FIG. 22 illustrates another enlarged, perspective view of the cyclone head section of the alternative embodiment of the present invention.
Figure 23:
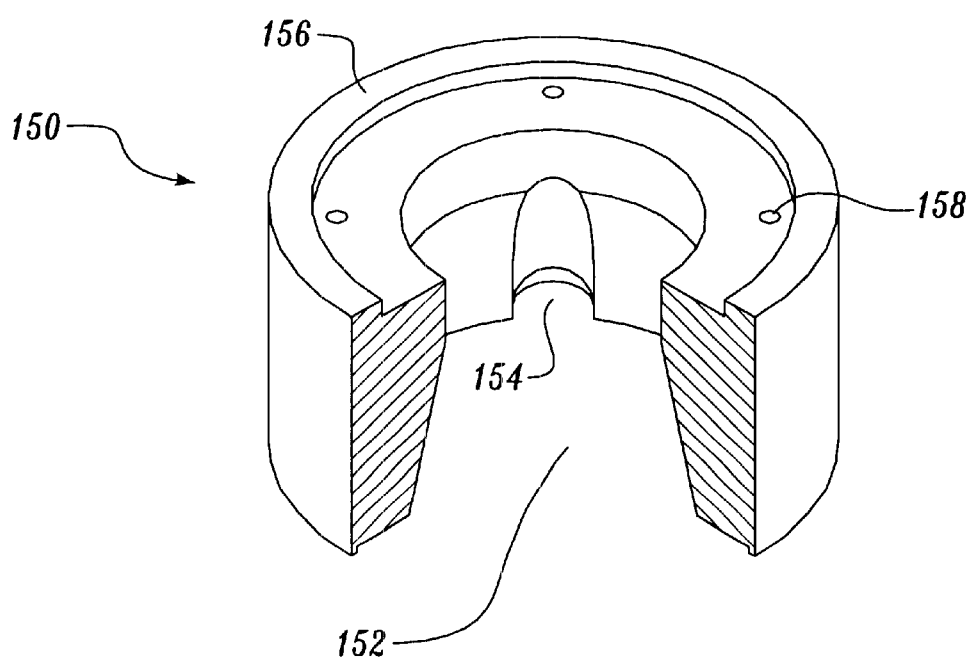
FIG. 23 illustrates an enlarged, perspective view of the top section of the alternative embodiment of the present invention.
Figure 24:
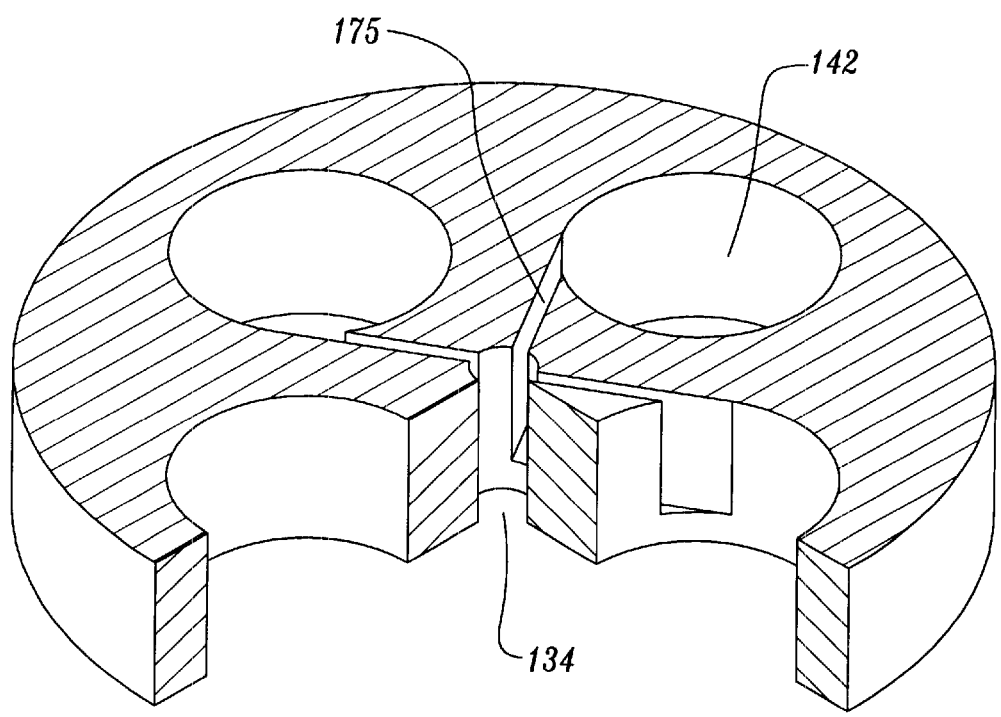
FIG. 24 illustrates an enlarged view of the cyclone head section of the particle separator assembly of the alternative embodiment of the present invention.

Alternatively, as shown in FIG. 22, tangential openings 195 are rectangular in shape and extend up toward the top of conical cyclone chamber 142.

Figure 25:
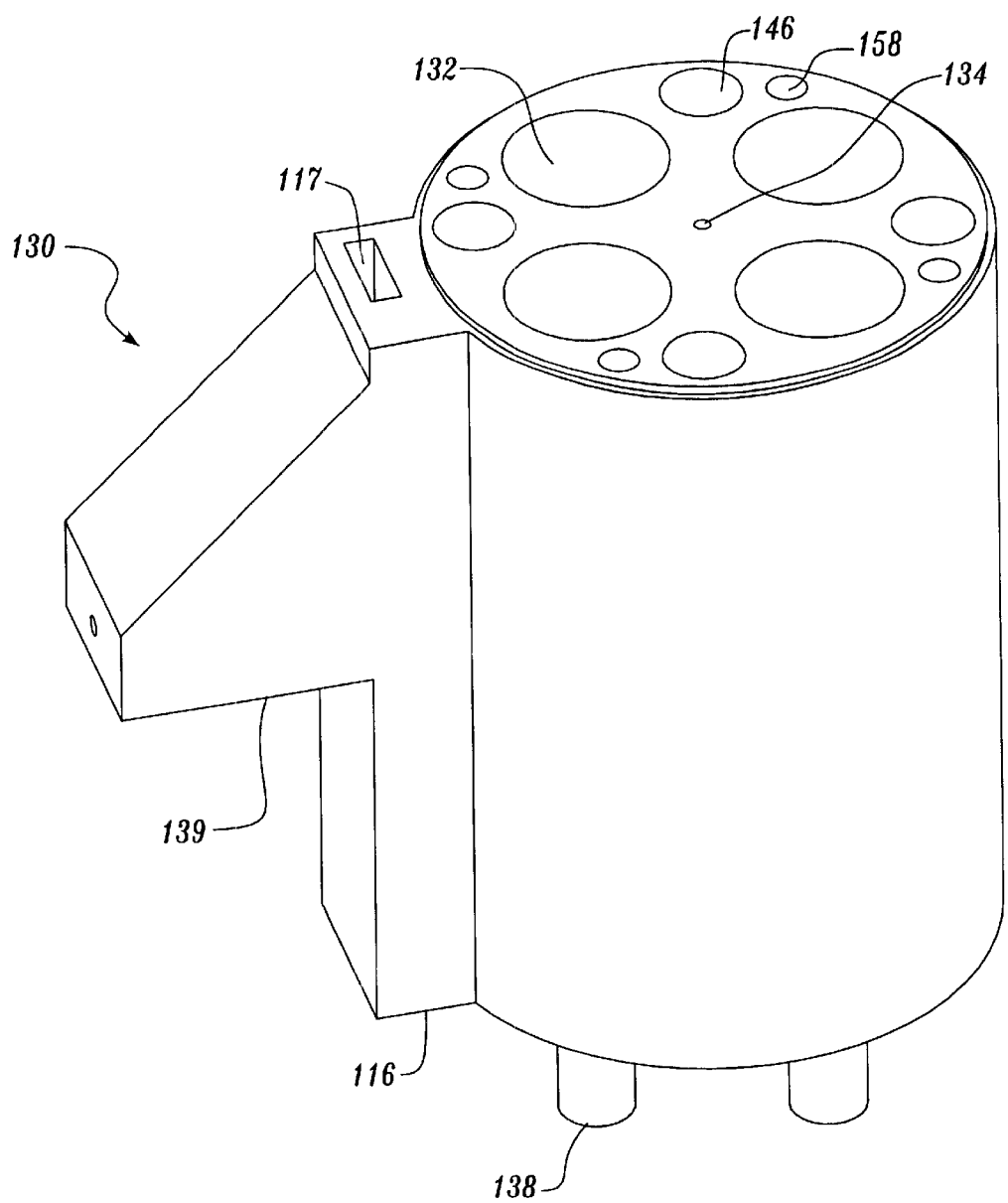
FIG. 25 illustrates an enlarged view of the cyclone chambers section of the particle separator assembly of the alternative embodiment of the present invention.
Figure 26:
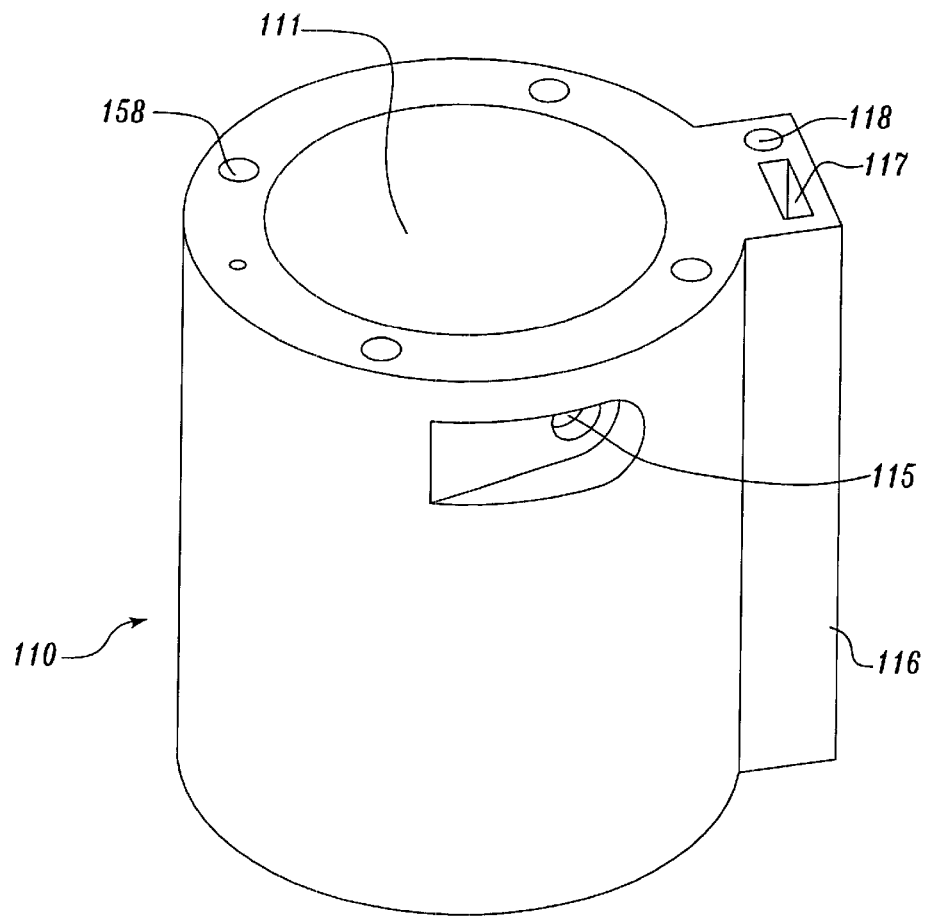
FIG. 26 illustrates an enlarged view of the reservoir section of the particle separator assembly of the alternative embodiment of the present invention.

As shown in FIG. 25, vertical column 116 attaches to the external surface of cyclone section 130 and includes a fluid collection and injection port 139. Fluid collection port 139 is located on vertical column 116 approximately midway down the external surface of cyclone section 130. A collection container may be attached to fluid collection and injection port 139 to collect the concentrated particle liquid from the reservoir or may be used to inject new liquid into the reservoir 111.

Figure 21:
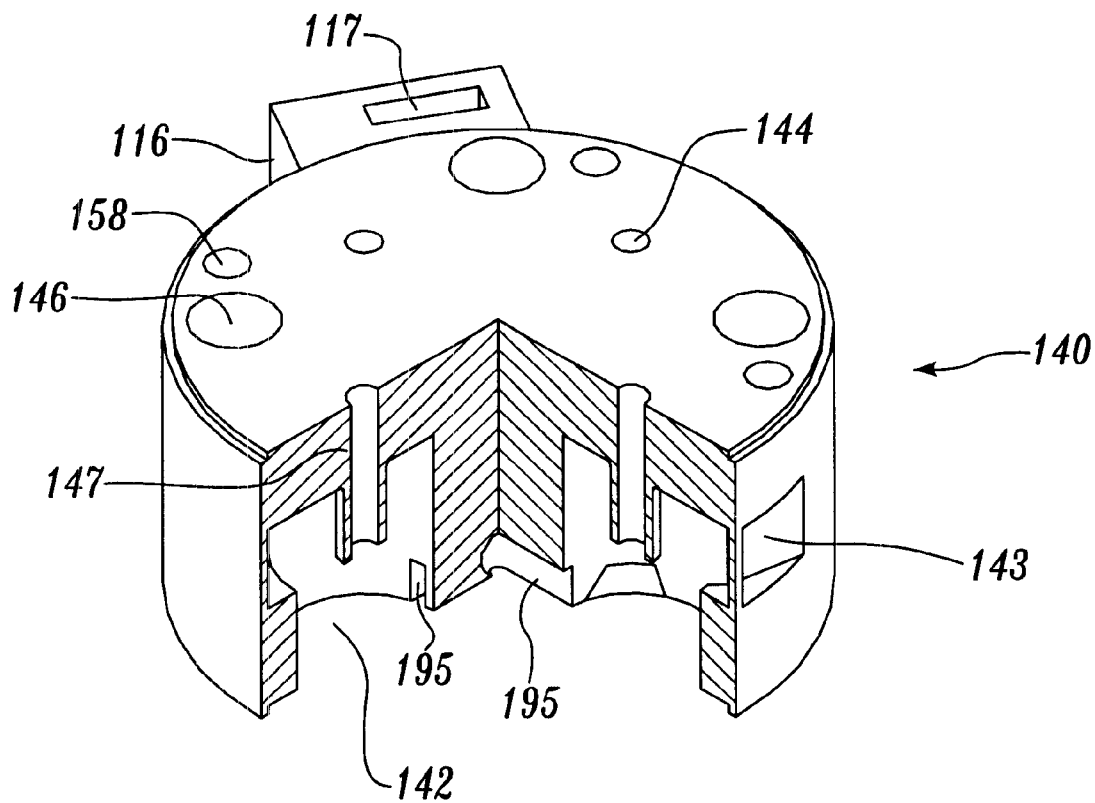
FIG. 21 illustrates an enlarged, perspective view of the cyclone head section of the alternative embodiment of the present invention.

As shown in FIGS. 16, 21 and 22, cyclone head section 140 attaches to the top of cyclone section 130. The cyclone head section 140 includes four cylindrical cyclone chambers 142. Each chambers 142 is aligned directly above a corresponding conical chambers 132. Cyclone head section 140 contains four inlets 143 that connects chambers 142 to the external environment. Chambers 142 further connects in fluid or flow communication with a corresponding cyclone chambers 132 to form the entire particle separation or cyclone chambers. Each inlet 143 has a generally rectangular shape in cross-section and connects to chambers 142 through an entrance wall (not shown). The entrance wall is tangential to the cylindrical inner surface of chambers 142. Each inlet 143 is also formed by a tapered entrance wall (not shown) to facilitate particle-laden gases to enter through inlet 143 to cylindrical chambers 142. The tapered wall projects away from the inner tangential wall of the cylindrical chambers 142 by approximately 35 degrees.

As shown in FIG. 21, four vent passageways 144 pass vertically through cyclone head section 140. Each vent passageway is disposed parallel to assembly axis 6 directly above chambers 142 and has a threaded inner surface (not shown). Four overfluid or flow pipes or vortex finder outlets 147, cylindrical in shape, have partial threaded outside surfaces (not shown). Each pipe 147 is attached to vents 144 by the meshing of the corresponding threaded surfaces. Overfluid or flow pipes 147 extend downwardly and into the respective cylindrical chambers 142 of cyclone head section 140. Each overfluid or flow pipe extends from the bottom of top section 150 to approximately the bottom of cyclone head section 140.

As shown in FIGS. 27A–27C, an outer cyclone separator 148 may attach to cyclone head section 140. Outer cyclone separator or chambers 148 is arranged concentrically about central axis 106. Referring to FIGS. 27A–27C (these FIGURES show an example of eight inner cyclone chambers instead of the four discussed previously), particle-laden gas enters outer cyclone vent 149 and into outer cyclone separator 148 and moves the gas in a helical fluid or flow. The helical structure of the outer cyclone separator 148 results in large particles (in this case >50 $\mu$m) being deposited on the inner surface of the outer cyclone, while air containing small particles is processed by the inner cyclones. The linear fluid or flow rate of 8 m/sec is diverted through outer cyclone inlet 149 to the inner cylinder at points corresponding to the eight inlets 143 of the inner cyclones chambers 132 around the circumference of the inner cylinder. Still referring to FIGS. 27A–27C, when outer cyclone separator 148 is desired, assembly 102 is modified so that vertical column 116 is not used. Liquid may be pumped to an exterior monitoring system (not shown) for analysis.

A catch bin (not shown) at the base of the outer cyclone separator 148 retains large particles as they fall to the bottom of the separator 148. If necessary, a set of short helical fins (not shown) can be attached to the outer wall whose purpose will be to cause particles near the outer wall to fluid or flow toward the bottom. Heavier inorganic particles that are not of interest in the collection of biological organisms that have densities larger than 1.0 gm will move to the outer wall of the outer helix and be discarded with the larger particles. Cleaning outer cyclone separator 148 is accomplished by closing the inlets 143, opening vents (not shown) in the catch basin and reversing fluid or flow of the blower unit to blow the large particles through the vents in the bottom of the catch basin.

Most of the incoming particle filled gas that enters cylindrical chambers 142 moves downward in an helical fluid or flow pattern through the cyclone chambers 132. Some of the downward fluid or flow leaves through the underfluid or flow outlet 138 and into vacuum transfer passages 146 and then exits out of upper vacuum chambers 152. The rest of the gas (after most of the particles have been separated and captured by the liquid) reverses its vertical direction and travels upwardly via an inner helical fluid or flow and exits the conical chambers through overflow pipe 147. This gas continues up through vents 144 and out of the assembly by the blower induced vacuum.

As shown in FIGS. 16 and 23, top section 150 is attached to the top of cyclone head section 140. Top section 150 includes an upper vacuum chambers 152 and an external coupling lip 156. External coupling lip 156 is attached to a blower or vacuum pump (not shown). Top section 150 has four clearance holes 158 that extend the entire length of assembly 102. Each vacuum transfer passage 146 exits into upper vacuum chambers 152 at an opening 154. Upper vacuum chambers 152 is connected in fluid or flow communication with the top of cyclone chambers 132 through vents 144 and cylindrical chambers 142.

In operation, a blower or vacuum pump draws outside gas into outer cyclone separator 148. Larger particles are separated from smaller particles and collected in a catch basin.

The smaller particles then enter the mini-cyclones in the cyclone particle separator assembly through radial inlets 143. Vacuum transfer channels 146, extending the entire length of the assembly 102, pull gas into the top of the cyclone chambers 132 and out through lower apex 138 of cyclone chambers 132. Gas entering the cyclone particle separation chambers 132 from inlet 143 swirls downwardly through cylindrical cyclone chambers 142 and into the conical shaped chambers 132 due to the tangentially aligned inlets 143. The gas travels in a helical pattern downwardly toward the bottom 135 of conical chambers 132. Due to centrifugal forces, the particles fluid or flow outwardly away from the center axis of the chambers 132 and toward the walls of the respective chambers 132. Liquid is pumped into chambers 132 from liquid reservoir 111 through the central liquid passage tube 134. This liquid wets the particles in chambers 132 and washes down the chambers walls flushing the particles into reservoir 12. The liquid is continuously recirculated through the conical chambers by the peristaltic pump (not shown) thereby concentrating the particles within the liquid over time. The liquid then can be pumped to an optionally integrated monitoring system comprised of detectors and sensors. The monitoring system then can send out a warning if toxic microorganisms are present.

EXAMPLE 2

A prototype device was designed to achieve a high fluid or flow rate, high collection efficiency for 1–15 micrometer (μm) particles, rejection of particles >50 μm and a low power consumption/pressure drop. Design specifications for this example device were established to meet the following requirements although other specifications are possible for different design geometries as established using the calculations described later.

100% rejection of particles >50 gm

Total air fluid or flow rate >_800 l/min

Collection efficiency for 2 gin particles >50%

Overall System Design

The cyclone separator design consists of a two stage system of concentric components to remove large particles and retain small particles. As shown in FIG. 27, a single large outer cyclone is used to separate and reject particles >50 μm. An inner bank of multiple mini cyclones operating in parallel captures and concentrates small particles <20 μm. This unit has the capacity to process 1000 liters per minutes (LPM) air fluid or flow, transferring collected bioparticles to a liquid stream for concentration and/or analysis. The design of both inner and outer structures is based on calculations using formulae that mathematically describe particle movement under the influence of cyclonic and gravitational forces.

In order to process an air stream at 1000 LPM (1 $m^3$/min.), we have formed a design for the inner cylinder housing the wet-walled multiple cyclone unit. The design accommodates eight mini wet-walled cyclones in a circular arrangement, each capable of a fluid or flow rate of 125 LPM. This will result in an inner unit with a diameter of 10 cm. Based on iterative calculations described below, a geometry yielding an inlet velocity of 8 m/sec has been selected to achieve the particle separating capability of the outer helical cavity (cyclone).

Inlet Fluid or Flow and Size Calculations

The geometry of the outer cyclone is determined on the basis of the total fluid or flow rate desired, i.e., 1000 LPM and the inlet velocity required to achieve the desired particle separation. For the design we have envisioned, large particles (>50 μm) must have a positive radial velocity so that they strike the inner wall of the outer cyclone. Small particles must have a negative radial velocity so that they will be captured by the inner bank of cyclones. The following calculations were used to determine the inlet velocity and inlet dimensions required.

The radial velocity of a particle at the wall of the 10 cm inner cylinder is calculated using the following formula:

$$V_{r0}=-Q/A \quad (1)$$

where

Q=volume fluid or flow rate in $cm^3$/sec and

A=area of inner cylinder exposed to air fluid or flow.

Therefore; $V_{r0}=-Q/A=-16670/\pi dh=-130$ cm/sec$=-1.30$ m/sec where d is the inner cylinder diameter (10 cm), and h is the inlet height (4.1 cm.).

Assuming Stokes law for the particle drag coefficient, the radial velocity of a particle in this outer channel would be:

$$V_{rp}=V_{r0}+^{t_V U^2}/R \quad (2)$$

where

U=inlet velocity (10 m/sec),

R=inner radius (0.05 in), and $t_V$=aerodynamic response time as defined by:

$$t_V=^{\rho_p D^2}/18\mu \quad (3)$$

where $\rho_p$=the particle density (1000 kg/$m^3$, assuming a bioparticle with average density of 1.0), D=the particle diameter in meters, and $\mu$=the viscosity of air ($1.8\times10^{-5}$).

Using equations 2 and 3, particle radial velocity can be calculated for particles of varying size at several inlet velocities (U). FIG. 33 illustrates a plot of particle diameter vs. $V_{rp}$ for a range of inlet velocities. Negative values for $V_{rp}$ indicate movement toward the inner wall which will result in capture by the inner wet-wall cyclones. A positive value for $V_{rp}$ indicates movement toward the outer wall. In the 10 m/sec inlet fluid or flow example, particles larger than 12 μm flow to the outside of the structure and smaller particles flow to the inner walls where they are captured by the wet-walled cyclones. At a larger inlet fluid or flow rate, 12 m/sec, the particle size cut-off for capture by the wet-wall cyclones reduces to 10 μm. At a lower fluid or flow rate of 8 m/sec, particles smaller that 20 μm are captured. In all cases, larger particles move toward the outer wall and settle to the bottom of the structure for removal.

Therefore in order to establish a fluid or flow rate of 1000 LPM, the inlet will require a cross sectional area of 16.7 cm2.

Fluid or flow rate in $m^3$/sec.=1.0 $m^3$/min/60 sec./min.=0.0167 $m^3$/sec.

Entry port area=0.0167 $m^3$/sec/8 m/sec=0.0021 $m^2$ or (21 $cm^2$)

For a square port, side dim.=(0.00167 $m^2$) exp 0.5=0.0458 m or 4.58 cm.

Therefore, the inlet dimensions for the outer cyclone should be approximately 4.6×4.6 cm.

The same set of calculations are used to determine the inlet dimensions for the inner cylinder of cyclones in order to collect particles in the 1–20 μm size range.

Figure 29:
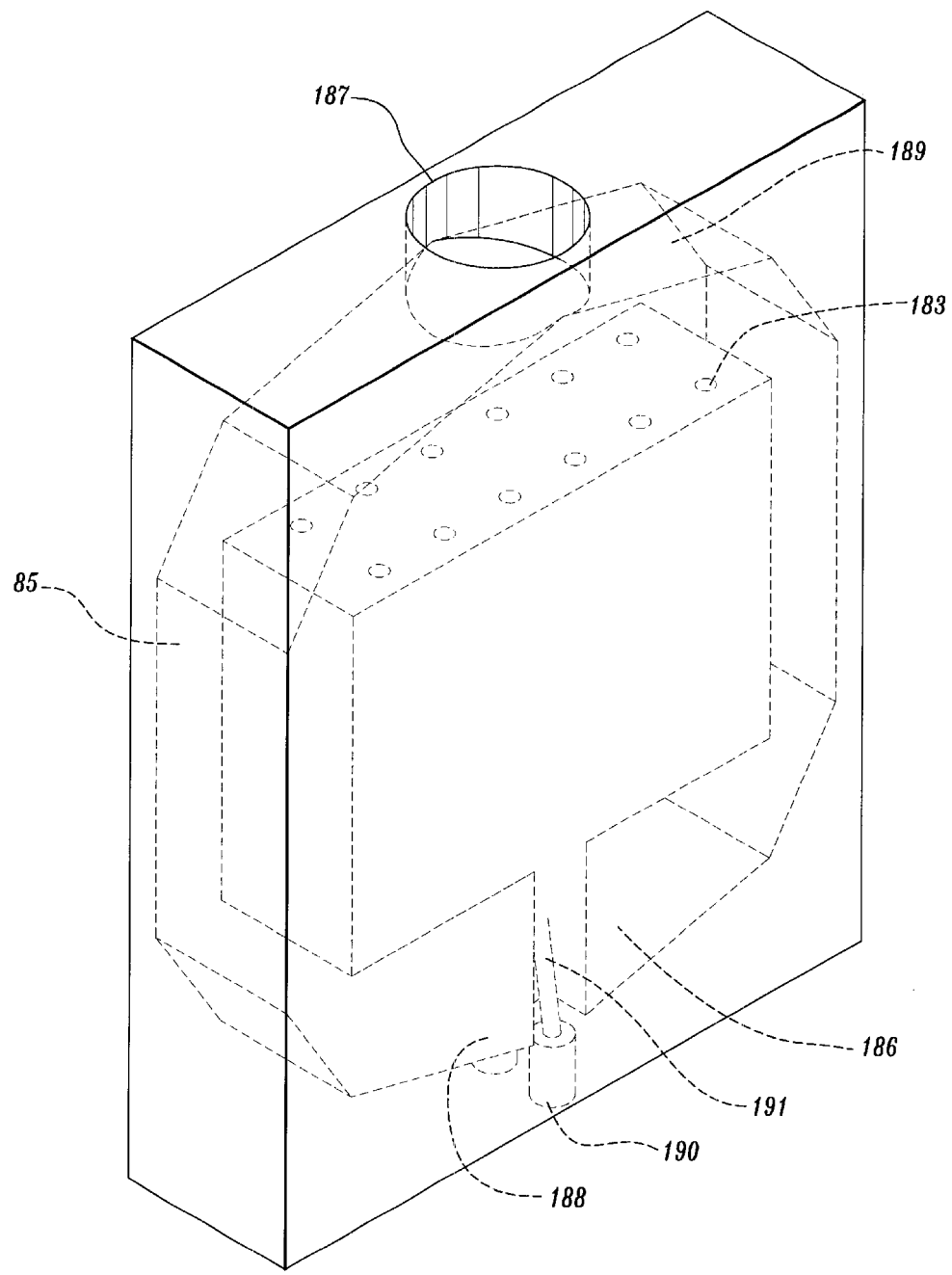
FIG. 29 illustrates a perspective view of another embodiment of the particle separator of the present invention.
Figure 30:
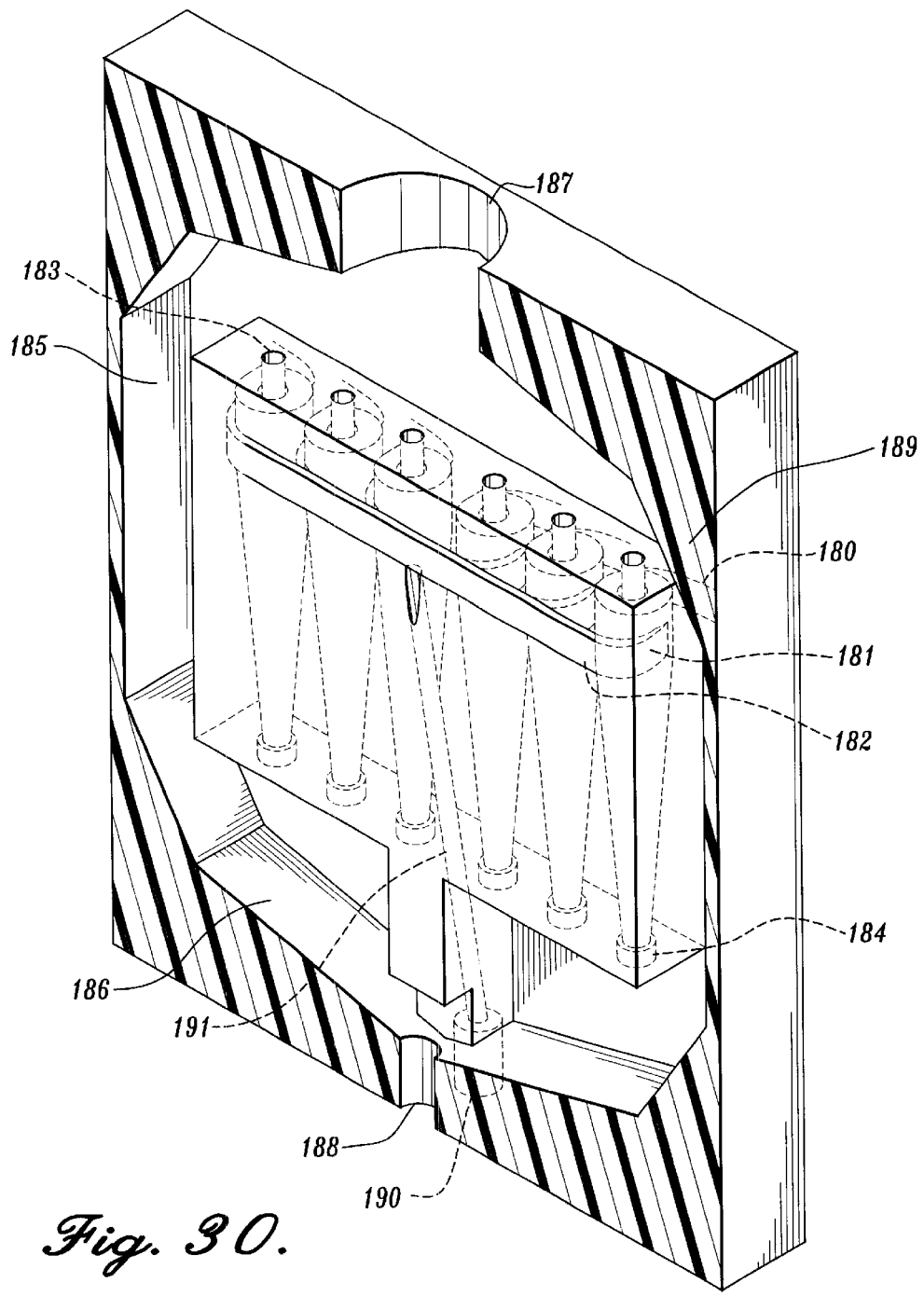
FIG. 30 illustrates a longitudinal section of the embodiment shown in FIG. 29.
Figure 31:
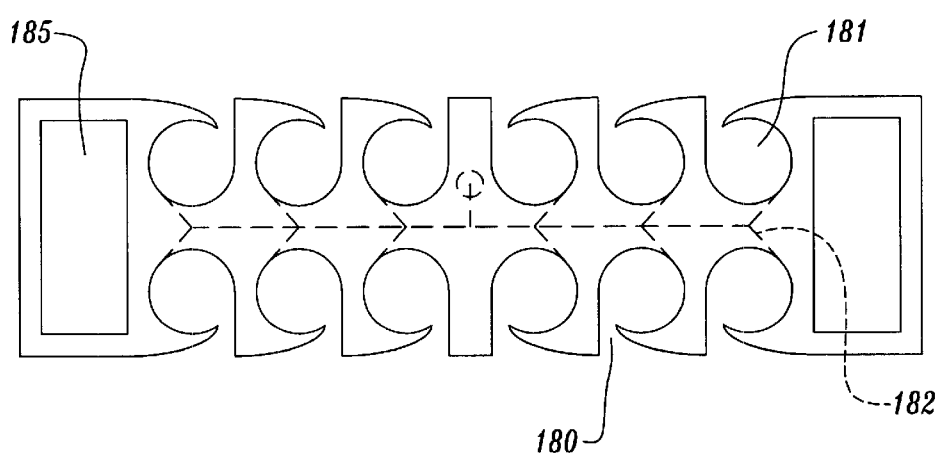
FIG. 31 illustrates a top section view of the embodiment shown in FIG. 30.
Figure 32:
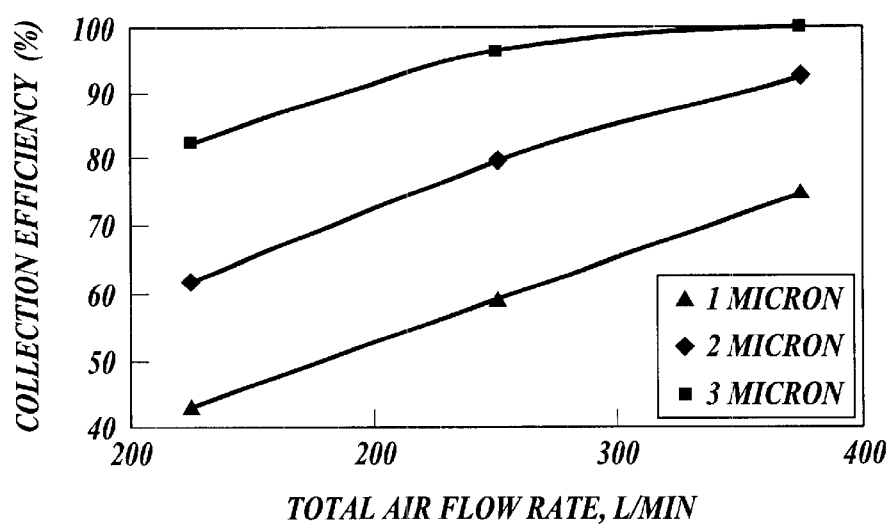
FIG. 32 illustrates the projected collection efficiency based on CFD modeling of the cyclone system as illustrated in FIGS. 1 and 16.
Figure 33:
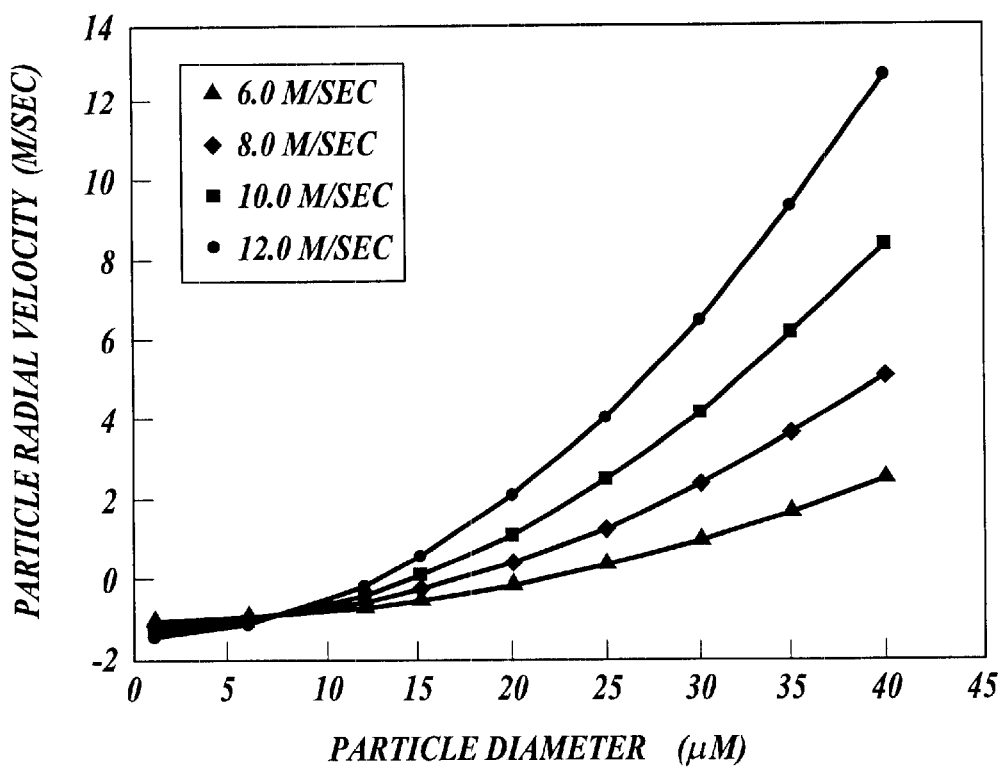
FIG. 33 illustrates a plot of particle diameter vs. $V_{rp}$ for a range of inlet velocities for the alternative embodiment described in EXAMPLE 2

In another embodiment of the present invention, FIGS. 29–31 depict the cyclone chambers arranged linearly instead of arranged about a central axis. Nonetheless, the apparatus shown in these FIGURES functions in a manner analogous to the apparatus of the prior FIGURES, discussed above.

Air enters the system through the cyclone inlet ports (180) such that its velocity is tangential to the main cylindrical section (181). As it rotates, liquid is introduced from the liquid injection ports (182) to coat the inner surface of the cylinder and collect the particles that are thrown out by the cyclonic air currents. Approximately half the air reverses flow and then flows out through the vortex finder (183) that receives suction from the upper vacuum chamber (189). The other half, along with the liquid (which now contains the particles) flows out of the underflow opening (184) and into the upper portion of the lower vacuum chamber (186). The air then flows through the air return channel (185) to the upper vacuum chamber, where it merges with the air that came through the vortex finder and is sucked out via a blower attached to the blower opening (187). The liquid separates from the air and drips into the fluid reservoir which is the bottom portion of the lower vacuum chamber(186) carrying the particles with it to the liquid outflow tube (188). In a "once through" application, the liquid is then sent to a sensor/detector (not shown), and fresh liquid is pumped (pump not shown) into the liquid input port (190) and back to the fluid injection ports(182) via the liquid input tube (191). In a "batch" application, the liquid is recirculated from the fluid reservoir (186) by pumping through the input tube and distributed to each cyclone through the injection ports (182) and down into the cylindrical section where it continues to capture particles that impact the walls through cyclonic forces.

It should be apparent that four conical chambers were used for explanation purposes only and that any number of conical chambers may be used. It should also be apparent that the parts associated with the conical chambers (vacuum transfer channels, upper cyclone vents, cyclone inlets, underfluid or flow pipes, and overfluid or flow pipes) will change correspondingly with the number of conical chambers. Two cyclone geometries are primarily illustrated, one with four mini-cyclones in a radial geometry that samples 360 degrees and one with 12 mini-cyclones in a bipolar geometry as shown in FIG. 29, with inlets facing opposite each other. However, the present invention should not be limited to these numbers of cyclones or geometries. The redial design can have more cyclones, and the cyclones themselves may be larger or smaller, depending on the desired particle sizes to be collected. The same is true for the bipolar system, greater or fewer number of cyclones can be used and the cyclones may be larger or smaller in size. A uni-polar design is also possible, with inlets facing in one direction.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A particle separator assembly for use with a blower and having a longitudinal assembly axis, the blower being connectable to the particle separator assembly and operable to draw a particle-laden gas stream through the particle separator assembly, the particle separator assembly comprising:
   a plurality of particle separation chambers, each of the particle separation chambers having an internal surface and operable to separate particles from the particle-laden gas stream supplied thereto;
   a vacuum chamber disposed in fluid flow communication with each of the particle separation chambers;
   an inlet for each particle separation chamber, the inlets directing particle-laden gas external from the assembly into the particle separation chambers and finally into the vacuum chamber;
   a liquid passage conduit connectable to a reservoir and in fluid flow communication with each particle separation chamber, the liquid passage conduit supplying a liquid from a reservoir to the internal surfaces of the particle separation chambers to wet such internal surfaces whereby the particles separated from the gas within each particle separation chamber collect on the wetted internal surfaces of the chambers and entrain within the supplied liquid; and
   an outlet for each particle separation chamber connected in fluid flow communication with the vacuum chamber for establishing fluid flow communication between the particle separation chambers and the vacuum chamber such that the particle separated gas and the particle entrained liquid exit the particle separation chamber outlets into the vacuum chamber.

2. The assembly according to claim 1, wherein the plurality of particle separation chambers are disposed about the longitudinal axis of the assembly.

3. The assembly according to claim 1, wherein the plurality of particle separation chambers is arranged in one or two rows about the lateral axis of the assembly.

4. The apparatus according to claim 2, wherein the liquid passage conduit is disposed along the longitudinal axis of the assembly.

5. The assembly according to claim 1, further comprising:

a reservoir in fluid flow communication with each particle separation chamber and the liquid passage conduit.

6. The apparatus according to claim 1, further comprising an outer cyclone chamber concentric to the longitudinal assembly axis, the outer cyclone chamber in fluid flow communication with the plurality of inlets.

7. The apparatus according to claim 6, wherein the outer cyclone chamber further comprises an inlet, the outer cyclone chamber inlet enabling particle-laden gas external from the apparatus to enter the plurality of particle separation chambers through the plurality of inlets.

8. A particle separator and collector assembly having a longitudinal axis, the assembly comprising:

at least one particle separation chamber each formed with an internal surface and a longitudinal axis;

a lower vacuum chamber disposed in fluid communication with the at least one particle separation chamber;

at least one inlet in fluid communication with the at least one particle separation chamber, the at least one inlet enabling particle-laden gas external from the assembly to enter the at least one particle separation chamber;

a liquid reservoir disposed in fluid communication with the lower vacuum chamber; and a liquid passage conduit interconnecting the liquid reservoir with the internal surface of the particle separation chamber to supply liquid from the reservoir to the internal surface of the particle separation chamber;

wherein the particle-laden gas is drawn into the at least one inlet by a blower and channeled in a helical pattern through the conical-shaped particle separator chamber and into the lower vacuum chamber, the particles being forced outwardly away from the longitudinal axis of the particle separation chamber by centrifugal force as the gas is channeled through the conical-shaped particle separation chamber resulting, in the particles being separated from the gas and collected by the liquid being supplied to the internal surface.

9. The assembly according to claim 8, further comprising an upper vacuum chamber disposed in fluid communication with the at least one particle separation chamber and at least one vacuum transfer channel, the at least one vacuum transfer channel interconnecting the upper vacuum chamber with the lower vacuum transfer channel.

10. The assembly according to claim 8, wherein the inlet is disposed tangential to the particle separation chamber so that the gas entering the particle separation chamber begins to move in a helical pattern.

11. An apparatus which separates particles from a gas stream and collects the particles within a liquid, the apparatus comprising:
    a housing defining a longitudinal axis, the housing comprising a top end portion connectable to a blower and a bottom end connectable to a pump;
    at least one cyclone chamber disposed within the housing and having an upper end and a lower end, the cyclone chamber having an outlet for exiting gas and liquid;
    at least one housing inlet in fluid communication with the cyclone chamber, the housing inlet enabling particle-laden gas external from the apparatus to enter the cyclone chamber;
    a liquid passage conduit disposed within the housing and connectable to a pump, the liquid passage conduit delivering the liquid to the upper end of the cyclone chamber; and
    a reservoir in fluid communication with a lower vacuum chamber, the cyclone chamber and the liquid passage conduit;
    wherein particle-laden gas is pulled through the cyclone chamber so that the particles are separated from the gas by centrifugal force and collected by the liquid supplied to the cyclone chamber, and wherein particle trapped liquid and particle separated gas exits the cyclone chamber through the cyclone chamber outlet.

12. The apparatus according to claim 11, further comprising a plurality of cyclone chambers disposed within the housing.

13. The apparatus according to claim 12, wherein the plurality of cyclone chambers are disposed equidistant around the longitudinal axis of the housing.

14. The apparatus according to claim 12, wherein the plurality of cyclone chambers are disposed around the lateral axis of the housing in one or two rows.

15. The apparatus according to claim 12, wherein the liquid passage conduit supplies the liquid to the plurality of cyclone chambers.

16. The apparatus according to claim 15, wherein the liquid passage conduit is disposed along the longitudinal axis of the housing.

17. The apparatus according to claim 11, the housing further comprising at least one vacuum transfer channel, the at least one vacuum transfer channel extends from the top end portion of the housing to the bottom end portion of the housing.

18. The apparatus according to claim 17, the housing further comprising an upper vacuum chamber disposed in the top end portion of the housing, in fluid communication with a vortex finder in the upper portion of the cyclone chamber, the at least one vacuum transfer channel connecting the cyclone chamber outlet with the upper vacuum chamber so that the gas stream is pulled through the cyclone chamber.

19. The apparatus according to claim 11, further comprising an outer cyclone chamber concentric to the longitudinal axis and coupled to the housing, the outer cyclone chamber in fluid communication with the housing inlet.

20. The apparatus according to claim 19, wherein the outer cyclone chamber further comprises an inlet, the outer cyclone chamber inlet enabling particle-laden gas external from the apparatus to enter the at least one cyclone chamber through the housing inlet.

21. A method for separating particles having an aerodynamic diameter greater than a specific cut size from a gas and entrapping the particles in a liquid using a particle separation assembly, the particle separation assembly having a plurality of cyclone separation chambers disposed longitudinally within a housing of the assembly and having an internal wall and defining a longitudinal axis, the housing including a top end connectable to a blower, a bottom end connectable to a pump, and housing inlets in communication with the cyclone separation chambers for external gas to enter the assembly, a liquid passage conduit connectable to the pump for delivering the liquid to the cyclone separation chambers, and a vacuum chamber in communication with the cyclone separation chambers, the method comprising:

drawing a particle-laden gas into the inlets of the housing and through the plurality of cyclone separation chambers so that a the gas flows in a circular path conforming to the configuration of the chambers;

separating particles greater than the cut size from the gas by the centrifugal force imposed on the particles from the circular flow path of the gas within the chambers to move the particles outwardly away from the longitudinal axis and toward the inner wall of each cyclone chamber;

supplying each cyclone chamber with the liquid through the liquid passage conduit;

entrapping the particles within the liquid and washing the particles down the inner walls of the cyclone chambers; and directing the particle entrapped liquid and the particle separated gas into the vacuum chamber.

22. The method according to claim 21, wherein the particle separation assembly further having an outer cyclone chamber having an inlet coupled to the housing and in fluid communication with the housing inlets, the method for separating particles from a gas and collecting the particles within a liquid using a particle separation assembly further comprising the steps of:

drawing a particle-laden gas into the inlet of the outer cyclone chamber;

separating the larger particles from the particle-laden gas so that the smaller particles enter the housing inlets; and removing the larger particles from the housing.

23. The method for separating particles from a gas and collecting the particles within a liquid using a particle separation assembly according to claim 21, further comprising the step of:

removing the particle-laden liquid for analysis; and monitoring the particles collected from the cyclone separation chambers.

24. An apparatus which separates particles from a gas and collects the particles within a liquid, the apparatus comprising:

at least one particle separation chamber having an inlet for supplying particle laden gas external from the apparatus to the particle separation chamber, an outlet, and an internal surface, the particle separation chamber operable to separate particles entrained in the gas;

a liquid passage conduit connected in fluid flow communication with the particle separation chamber, the liquid passage conduit connectable to a reservoir and operable to supply liquid from the reservoir to the internal surface of the particle separation chamber; and a vacuum chamber connected in fluid flow communication with the particle chamber outlet such that the particle separated gas and the particle entrained liquid exit the particle separation chamber outlet into the vacuum chamber.

25. An apparatus which separates particles from a gas stream and collects the particles within a liquid, the apparatus comprising:

at least one particle separation chamber having an inlet for supplying particle laden gas external from the apparatus to the particle separation chamber, an outlet for allowing the gas or liquid to exit the particle separation chamber, and an internal surface, the particle separation chamber operable to separate particles entrained in the gas;

a reservoir for holding a liquid;

a liquid passage conduit interconnecting the reservoir and the particle separation chamber in fluid flow communication, the liquid passage conduit operable to supply the liquid from the reservoir to the internal surface of the particle separation chamber; and a vacuum chamber connected in fluid flow communication with the particle chamber outlet and the reservoir, the vacuum chamber adapted to receive exiting particle separated gas and the particle entrained liquid from the particle separation chamber.

26. An apparatus which separates particles from a gas stream and collects the particles within a liquid, the apparatus comprising:

a housing defining a longitudinal axis, the housing comprising a top end portion connectable to a blower and a bottom end connectable to a pump;

a plurality of cyclone chambers having a longitudinal axis substantially parallel to the housing longitudinal axis, the cyclone chambers disposed within the housing such that the longitudinal axis of the cyclone chambers are equidistant from the housing longitudinal axis;

a housing inlet in fluid communication with each cyclone chamber, the housing inlets enabling particle-laden gas external from the apparatus to enter the cyclone chambers; and a liquid passage conduit disposed within the housing and connectable to a pump, the liquid passage conduit delivering the liquid to the cyclone chambers;

wherein particle-laden gas is pulled through the cyclone chambers so that the particles are separated from the gas by centrifugal force and collected by the liquid supplied thereto.

* * * * *

UNITED STATES PATENT AND TRADEMARK OFFICE
CERTIFICATE OF CORRECTION

PATENT NO.   : 6,468,330 B1                                                Page 1 of 1
DATED        : October 22, 2002
INVENTOR(S)  : P.M. Irving et al.

It is certified that error appears in the above-identified patent and that said Letters Patent is hereby corrected as shown below:

<u>Title page,</u>
Item [57], ABSTRACT,
Line 15, "apex of cyclone" should read -- apex of the cyclone --
Line 30, "chamber walls flushing" should read -- chamber walls, flushing --
Line 32, "pump thereby" should read -- pump, thereby --

<u>Column 16,</u>
Line 12, "such internal surfaces" should read -- such internal surfaces, --
Line 47, "chamber each" should read -- chamber, each --

<u>Column 17,</u>
Line 2, "separation chamber" should read -- separation chamber, --
Line 2, "resulting," should read -- resulting, --

<u>Column 18,</u>
Line 26, "that a the" should read -- that the --

Signed and Sealed this

Twenty-ninth Day of April, 2003

JAMES E. ROGAN
*Director of the United States Patent and Trademark Office*